(12) United States Patent
Selinger et al.

(10) Patent No.: US 8,244,564 B2
(45) Date of Patent: Aug. 14, 2012

(54) MULTI-STRATEGY GENERATION OF PRODUCT RECOMMENDATIONS

(75) Inventors: David Lee Selinger, Castro Valley, CA (US); Michael James DeCourcey, Belmont, CA (US); Randall Stuart Fish, Castro Valley, CA (US); Bradley Ross Cerenzia, Seattle, WA (US); Tyler David Kohn, San Francisco, CA (US); Darren Erik Vengroff, Seattle, WA (US)

(73) Assignee: RichRelevance, Inc., San Francisco, CA (US)

( * ) Notice: Subject to any disclaimer, the term of this patent is extended or adjusted under 35 U.S.C. 154(b) by 670 days.

(21) Appl. No.: 12/415,896

(22) Filed: Mar. 31, 2009

(65) Prior Publication Data

US 2010/0250336 A1 Sep. 30, 2010

(51) Int. Cl.
*G06Q 40/00* (2012.01)
(52) U.S. Cl. ...................................... 705/7.11; 705/7.12
(58) Field of Classification Search .................... 705/10, 705/7.11, 7.12
See application file for complete search history.

(56) References Cited

U.S. PATENT DOCUMENTS

| | | | |
|---|---|---|---|
| 6,601,075 B1 * | 7/2003 | Huang et al. .................. | 707/748 |
| 6,963,867 B2 * | 11/2005 | Ford et al. ...................... | 707/752 |
| 2005/0289018 A1 | 12/2005 | Sullivan et al. | |
| 2008/0109285 A1 | 5/2008 | Reuther et al. | |
| 2008/0215416 A1 | 9/2008 | Ismalon | |
| 2008/0288348 A1 * | 11/2008 | Zeng et al. ....................... | 705/14 |
| 2008/0306819 A1 * | 12/2008 | Berkhin et al. .................. | 705/14 |
| 2009/0006216 A1 * | 1/2009 | Blumenthal et al. ............. | 705/26 |
| 2011/0060621 A1 * | 3/2011 | Weller et al. ................. | 705/7.29 |
| 2011/0112887 A1 * | 5/2011 | Rizzolo et al. ............... | 705/7.28 |

OTHER PUBLICATIONS http://mashable.com/2008/12/11modista/"MODISTA": Dec. 11, 2008. pp. 1-45.*
"Find a $50 Version of Those $500 Shoes with Modista," retrieved on Feb. 27, 2009, from http://mashable.com/2008/12/11/modista/, 12 pages.
"Modista: browse for shoes and handbags by visual similarity," retrieved on Feb. 27, 2009, from http://www.modista.com/, 1 page.
"Modista: Jessica Bennett Fame," retrieved on Feb. 27, 2009, from http://www.modista.com/, 1 page.
"Modista: Women's Shoes," retrieved on Feb. 27, 2009, from http://www.modista.com/, 1 page.

(Continued)

*Primary Examiner* — Thomas Dixon
*Assistant Examiner* — Benjamin S Fields
(74) *Attorney, Agent, or Firm* — Seed IP Law Group PLLC

(57) ABSTRACT

Techniques are described for dynamically generating recommendations for users, such as for products and other items. In at least some situations, the techniques include using multiple recommendation strategies, such as by aggregating recommendation results from multiple different recommendation strategies. Such recommendation strategies may have various forms, and may be based at least in part on data regarding prior interactions of numerous users with numerous items. In addition, information about current selections of a particular user may be gathered based at least in part on providing a GUI ("graphical user interface") for display to the user that includes selectable information about numerous recommended items, and dynamically updating the displayed GUI with newly generated recommendations of items as the user makes selections of particular displayed recommended items (e.g., newly generated recommendations that are similar to the selected items in one or more manners, or are otherwise related to the selected items).

50 Claims, 10 Drawing Sheets

OTHER PUBLICATIONS

"Online Shopping for Shoes and Handbags," retrieved on Feb. 27, 2009, from http://www.ssasychic.com/fashion/modista-a-new-way-to-shop/, 5 pages.

"Superfish—Search by Sight," retrieved on Feb. 27, 2009, from http://www.superfish.com/, 1 page.

"JewelryViewer," retrieved on Feb. 27, 2009, from http://www.jewelryviewer.com/, 1 page.

"Want a Better Way to Search Amazon and eBay? Try PicClick," retrieved on Feb. 27, 2009, from http://mashable.com/2008/11/25/picclick/, 22 pages.

* cited by examiner

MULTI-STRATEGY GENERATION OF PRODUCT RECOMMENDATIONS

TECHNICAL FIELD

The following disclosure relates generally to dynamically generating product recommendations for users, such as by using multiple recommendation strategies and various information regarding prior user interactions with products.

BACKGROUND

In addition to providing access to information, the World Wide Web (also referred to as the "Web") has increasingly become a medium that is used to search for, shop for and order items (such as products, services and/or information) that are available for purchase, rent, lease, license, trade, evaluation, sampling, subscription to, etc. In many circumstances, a user may visit the Web site of a Web merchant or other online retailer that provides one or more items (sometimes referred to as a "Web store"), such as to view information about the items, give an instruction to place an order for one or more items, and provide information needed to complete the purchase (e.g., payment and shipping information). After receiving an order for one or more items, the online retailer then fulfills the order by providing the ordered items to the indicated recipient, such as by delivering product items electronically (e.g., music downloaded over the Internet) and/or through physical distribution channels (e.g., shipment via a governmental postal service or private common carrier, such as for paperback books). Similarly, some service items may be provided electronically (e.g., providing email service), while others may be provided physically (e.g., performing cleaning services at the purchaser's house).

While access to information about items via the Web provides many benefits, various problems also exist. As one example, given the large numbers of items that may be available from various online retailers, it can be difficult for a user to identify particular items that may be of interest. In addition, while various approaches to automatically generating recommendations for users have been tried, such generated recommendations have various problems, including that any given approach to generating recommendations is typically useful only in certain limited situations, if at all.

DETAILED DESCRIPTION

Figure 1:
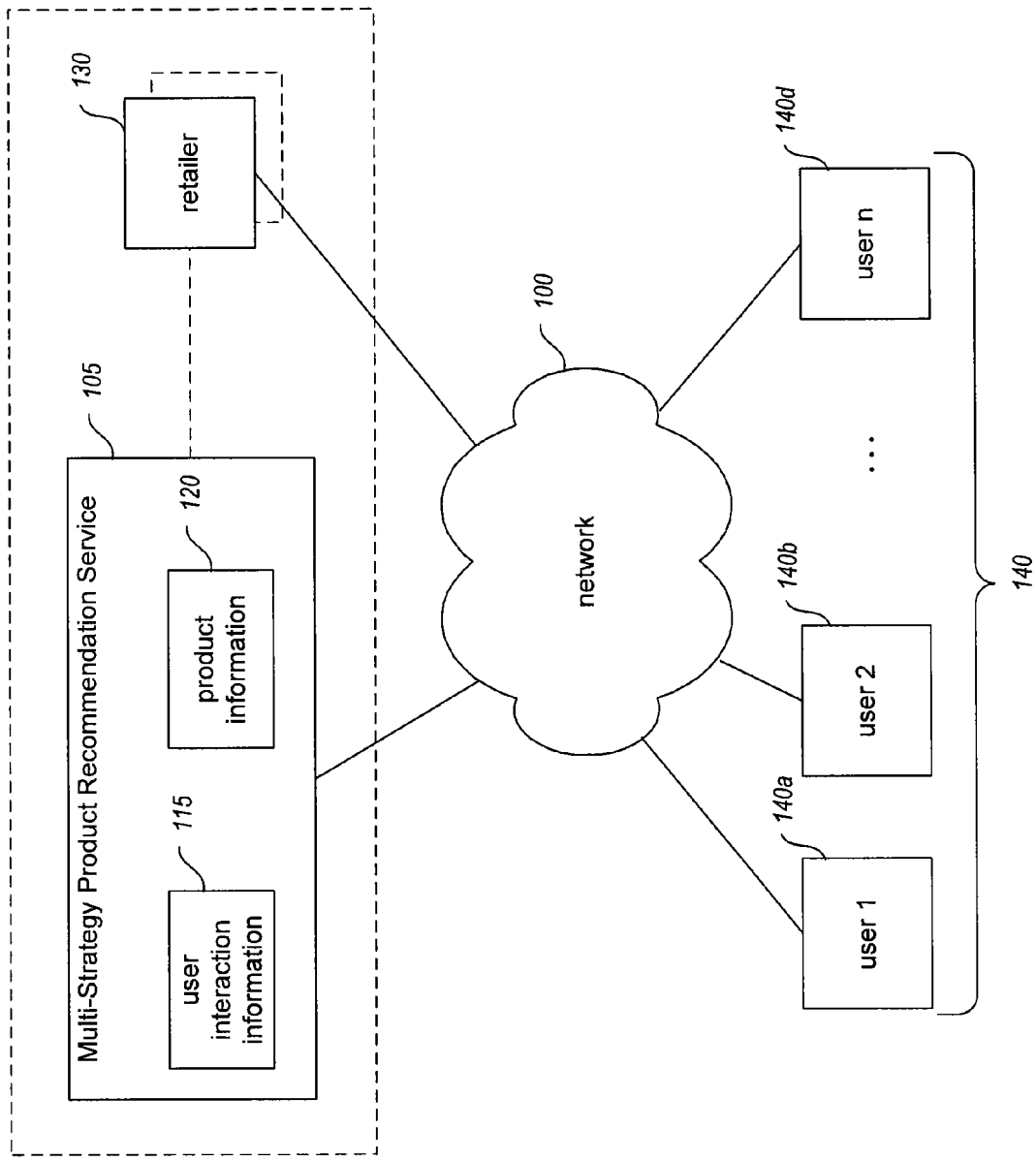
FIG. 1 is a network diagram illustrating an embodiment of a multi-strategy product recommendation service for dynamically generating product recommendations for users.

Techniques are described for dynamically generating recommendations for users, such as for products and other items. In at least some embodiments, the techniques include using multiple recommendation strategies in one or more of various ways, such as by aggregating recommendation results for a particular user and a particular situation from multiple different recommendation strategies. Such recommendation strategies may have various forms, and in some embodiments may be based at least in part on data regarding prior interactions of numerous users with numerous items. In addition, in at least some embodiments, information about current selections of a particular user may be gathered based at least in part on providing a GUI ("graphical user interface") for display to the user that includes selectable information about numerous recommended items, and dynamically updating the displayed GUI with newly generated recommendations of items as the user makes selections of particular displayed recommended items (e.g., newly generated recommendations that are similar to the selected items in one or more manners, or are otherwise related to the selected items). Additional details related to particular recommendation strategies, to aggregating and otherwise using multiple recommendation strategies, and to interacting with users via a displayed GUI in various manners are included below. In addition, at least some of the described techniques may be automatically performed in at least some embodiments by a computer-implemented Multi-Strategy Product Recommendation ("MSPR") service, as described in greater detail below.

As noted above, the recommendation strategies that may be used may have various forms in various embodiments, and in some embodiments may be based at least in part on data regarding prior interactions of numerous users with numerous items. For example, in at least some embodiments, the prior interactions of users with items may involve interactions of customers of one or more retailers related to products or other items that are available from those retailers, or instead may involve interactions of other types of users in other situations (e.g., users who perform searches with search engines, users who view information about products from a product review service, etc.). A non-exclusive list of types of interactions of customers of online or other retailers with items for which interaction data is gathered may include, for example, the following: performing searches (e.g., for particular items, for items of a particular category or other defined group of items, for items having one or more indicated attributes, etc.); browsing item categories; viewing detailed information about particular items; purchasing items; doing item returns; etc. The interaction data about the prior user interactions with items may then be analyzed and summarized in various ways, such as, for example, in the following non-exclusive manners: to identify items that are popular (e.g., the top item sellers in a particular category or from a particular retailer during a particular period of time; the items that are most often selected by users, such as to view detailed information about the items; the items with the highest user ratings; the items most often included in results of users' searches and/or selected by users from such search results; the "hottest" items of an item group to reflect those items having the largest changes in their ratings or sales or other popularity measure during a particular period of time; etc.); to identify items that are similar to each other or otherwise related to each other (e.g., items that have similar or otherwise related items attributes, such as price, type, size, etc.; users who viewed this item are most likely to also view these other items; users who viewed this item are most likely to purchase these items; users who purchased this item are most likely to also purchase these other items; users who searched for this item attribute and/or browsed this item category are most likely to view and/or purchase these items or items with these attributes or items in these categories; etc.); to identify items that are popular among users similar to a user for whom recommendations are being made (e.g., users with similar demographics; users in the same or nearby geographic regions, etc.); to identify items that have been explicitly associated with one another, such as by a retailer, an advertiser, a manufacturer, and/or another user (e.g., "buy together" items); to identify items that are similar or otherwise related to items interacted with by a particular user, such as a user to whom recommendations are to be provided (e.g., interactions related to items purchased by the user, items viewed by the user, items added to a shopping cart of the user, etc.); etc. Some or all of the various types of analyzed or summarized user interaction data may then each be used as a distinct recommendation strategy, such as to use information about top item sellers in a particular category as one recommendation strategy when a user interest in that category is indicated or suspected, to use information about users who viewed a particular item as being most likely to purchase other identified items as one recommendation strategy when a user interest in that particular item is indicated or suspected, etc. Additional details related to particular recommendation strategies are included below.

In addition, as previously noted, multiple recommendation strategies may be used in various ways in various embodiments. For example, in some embodiments and situations, recommendation results from multiple available recommendation strategies may be gathered for a particular situation involving a particular user, and then those various recommendation results may be aggregated in various manners. As one example of aggregating various recommendation results from multiple recommendation strategies, the various recommendation results may be weighted or otherwise ranked, so as to determine relevance scores or other relevance levels for those recommendation results, and then some or all of those various recommendation results may be selected to be used as recommendations for that user based on those weightings or other rankings. The weighting or other ranking of various item recommendation results may be performed in various manners, such as based on a weighting or ranking provided by a particular recommendation strategy that recommended the item (e.g., with a top sellers recommendation strategy weighting the highest item seller as the top recommendation for that strategy, and progressively weighting lower sellers as lower recommendations), based on inclusion of a particular item recommendation in the results from multiple different recommendation strategies, etc. In other embodiments, relevance scores or other levels may be determined for particular recommended items in manners other than based on weighting or other ranking. In addition, in other embodiments, a particular one of multiple available recommendation strategies may instead be selected for use in a particular situation, such as based on a dynamic determination that the particular recommendation strategy is optimal or otherwise preferred for the particular situation, or instead based on a prior selection or configuration to use that particular recommendation strategy in that particular situation (e.g., based on prior configuration by a human operator, based on a prior automated selection of that particular recommendation strategy, etc.). A dynamic determination to use a particular recommendation strategy at a given time based on a current situation may be based on, for example, a comparison of the results from the recommendations of that particular recommendation strategy to recommendation results from one or more other possible recommendation strategies, a failure or other inability of other possible recommendation strategies to provide useful recommendation results or any recommendation results, etc. Additional details related to using multiple recommendation strategies are included below.

Furthermore, as previously noted, information about current selections of a particular user may be gathered in at least some embodiments based at least in part on providing a GUI for display to the user that includes selectable information about numerous recommended items. For example, a Web page may be generated and displayed to a user that includes images of and/or other indications of numerous items, such as for an initial group of recommended items, and with the images or other displayed indications of the items being selectable by the user. If the user makes a current selection of one of the recommended items, a second group of recommended items may be dynamically generated for the user based at least in part on the current selection, and then displayed to the user via the GUI, such as for a second group that includes some or all of the items of the first group (and optionally additional items), or instead a second group that does not include any of the items of the first group. Similarly, if the user makes a second current selection of one of the recommended items of the second group, a third group of recommended items may similarly be dynamically generated for the user based at least in part on the current selection(s), and then displayed to the user via the GUI. Such user selections may continue to be repeatedly monitored and used in this manner as part of an ongoing interactive recommendation exploration session, and in some embodiments other types of user selections may similarly be used (e.g., a user selection to remove one or more currently selected items from the group of current selection, also referred to as a "de-selection"; other user feedback of a positive or negative nature regarding one or more currently selected items or other items; etc.). Non-limiting examples of portions of one such GUI are illustrated with respect to FIGS. 2A-2D. In addition, as previously noted, the recommendation results from one or more recommendation strategies may be weighted or otherwise ranked in some embodiments, and if so the recommended items that are displayed to a user via the GUI may be displayed so that items with higher rankings are displayed more prominently than other items with lower rankings (e.g., by displaying the items in decreasing order of their associated rankings, such that the items with the highest rankings are displayed first; by using different fonts, colors, placement or other visual indications to indicate items with higher rankings; etc.). Thus, for example, if the display of a second group of recommended items replaces a prior display of a first group of recommended items, and the second group includes at least some of the items of the first group, the weighting of those items from the first group may change in the second group, and thus the prominence of the display of those items from the first group may similarly change in the display of those items as part of the second group. Furthermore, in at least some embodiments, the display of a second group of recommended items that replaces a prior display of a first group of recommended items may be performed in various manners, including to modify a previously displayed Web page without reloading the Web page in a client browser application (e.g., via the use of AJAX, or Asynchronous JavaScript and XML, or other scripting or instructions or execution mechanisms included as part of the previously displayed Web page). Additional details related to displaying GUIs and recommended items to users are included below.

FIG. 1 is a network diagram illustrating an embodiment of a multi-strategy product recommendation service for dynamically generating product recommendations for users using the described techniques. With respect to at least some embodiments below, the discussion may refer to recommending "products" to users, but it will be appreciated that the same or similar techniques may be applied to other types of items in other embodiments.

In particular, the illustrated example of FIG. 1 includes a number of example users 140 that are each interacting with an example embodiment of a Multi-Strategy Product Recommendation ("MSPR") service 105 and/or with an example retailer 130 (e.g., an online retailer) over a network 100. The network 100 may, for example, be a publicly accessible network of linked networks, possibly operated by various distinct parties, such as the Internet. In other embodiments, the network 100 may be a private network, such as, for example, a corporate or university network that is wholly or partially inaccessible to non-privileged users. In still other embodiments, the network 100 may include both private and public networks with one or more of the private networks having access to and/or from one or more of the public networks. Furthermore, the network 100 may include various types of wired and/or wireless networks in various situations. In this illustrated example of FIG. 1, the users 140 may each use computing systems and/or devices (not shown) to interact with the MSPR service 105 and/or the retailer 130 to obtain various described functionality via the network 100, and in doing so may provide various types of indications or other information to the MSPR service 105 and/or the retailer 130. The interactions of the users with the MSPR service 105 and/or the retailer 130 may occur in various ways in various embodiments, such as, for example, in an interactive manner via a GUI displayed on computing systems and/or other devices (not shown) of the users 140, or in a programmatic manner via an API ("application programming interface") provided by the MSPR service 105 and/or the retailer 130 that allows computing systems and/or programs to invoke such functionality programmatically, such as using Web services or other network communication protocols.

In this illustrated example, each of the users 140 may interact with an embodiment of the MSPR service 105 to obtain recommendations for products available from a retailer 130, such as to obtain dynamically generated product recommendations for the user in particular situations. In this illustrated example, the MSPR service 105 includes or otherwise has access to various product information 120 and user interaction information 115. The product information 120 may, for example, include a database and/or other data collection related to a catalog of products and/or services available from one or more retailers 130, such as may include descriptions, prices, availability and other information about the products and/or services. The user interaction information 115 may, for example, include information regarding how numerous of the users 140 and/or other users have previously interacted in various ways with products included in product information 120. As part of recommending products for a particular one of the users 140, the illustrated MSPR service 105 may process the product information 120 using various recommendation strategies to identify or otherwise determine which products of the numerous products available from the retailer 130 to recommend to the particular user, such as by identifying the products that are determined to be most relevant to the user based on the various recommendation strategies and the currently available information. In some embodiments, at least some of the recommendation strategies may use the user interaction information 115 to determine which products to recommend to a particular user, such as to identify products that are popular, to identify products that are similar to or otherwise related to one or more other products currently selected by the user or otherwise determined to be of current interest to the user, and/or to otherwise likely to be of interest to a particular user based at least in part on prior interactions of multiple users. As previously noted, in some embodiments, the MSPR service 105 may generate product recommendations for users based at least in part on aggregating results of multiple recommendation strategies, such as discussed in more detail elsewhere.

The illustrated embodiment of MSPR service 105 may provide for each of the interacting users 140 a GUI that displays multiple recommended products to the user and allows the user to interactively select or otherwise indicate an interest in one or more of the displayed recommended products, with the MSPR service 105 providing new and/or revised product recommendations to display to the user in the provided GUI using one or more recommendation strategies as the user indicates an interest in the recommended products. For example, in some embodiments, a user may interact with a GUI provided by the MSPR service 105 to successively indicate interest in one or more displayed recommended products, with a new group of recommended products being generated and provided for display to the user based upon each successive indication. In some such embodiments, the successive indications of interest of the user may be collected and/or otherwise compiled by the GUI such that the new group of recommended products may be generated using one or more recommendation strategies based at least in part on the collected successive indications of the user's interest. For example, in some embodiments, each of the collected successive indications of interest of a user may be used to determine a respective set of product recommendations for the user based on the indication, with the new group of product recommendations being an aggregation of results of each generated respective set of product recommendations.

In various embodiments, the GUI provided by the MSPR service 105 may enable a user to indicate an interest in one or more displayed recommended products in various ways, such as by providing one or more user-selectable controls that allow users to select a displayed recommended product, deselect a previously selected product, reject a displayed recommended product, and/or otherwise provide feedback of a positive or negative nature for a displayed recommended product (e.g., based on providing user ratings or rankings). After the user interacts to indicate an interest in one or more recommended products, the indications of interest of the user may be provided to the MSPR service 105, such that the MSPR service 105 may use the indications as part of one or more recommendation strategies to identify products of the product information 120 that may be of interest to the particular user. For example, the MSPR service 105 may use such received indications of interest to identify products of a similar nature or kind to the selected recommended products and/or to identify products that are otherwise related to or associated with the selected recommended products (e.g., such as to reflect relationships determined based on prior user interactions with the products on the part of the user to whom recommendations are currently being provided and/or on the part of other users; relationships explicitly specified by a manufacturer, retailer, advertiser, or user(s); etc.). As such, each of the users 140 may interact with the MSPR service 105 via an embodiment of the provided GUI to obtain recommendations for products that are available from the retailer 130 and are of particular interest to the user. For example, an example user 1 140*a* may interact with MSPR service 105 via the provided GUI (displayed on a client computing system or device of the user 1) to indicate one or more recommended products that are of interest to the user 1 and to obtain product recommendations based on user 1's particular indications of interest, while a distinct example user 2 140b may interact with the MSPR service 105 via the provided GUI (displayed on a distinct client computing system or device of the user 2) to indicate one or more other recommended products that are of interest to the user 2 and to obtain other product recommendations based on the indications of interest of the user 2.

In various embodiments, the MSPR service GUI may be presented in various manners and may provide various types of additional and/or other interactivity and functionality for the users 140, with at least one illustrative example embodiment of such a GUI being described with respect to FIGS. 2A-2D. In at least one embodiment, the GUI of the MSPR service 105 may be provided in the form of one or more Web pages that are generated by the MSPR service 105, which may be obtained by various of the users 140 via the network 100, such as for display in a Web browser executing on one or more client computing systems and/or devices of the various users 140.

In some embodiments, each of the users 140 may interact with the MSPR service 105 to obtain product recommendations for one or more particular subgroups of the products available from the retailer 140, such that product recommendations generated by the MSPR service 105 may be limited to products that are included in the one or more particular subgroups. For example, such subgroups may include products that are grouped in various manners, such as to reflect products of a particular category and/or type (e.g., clothing, jewelry, books, tools, etc.), products available in a particular department of a retailer (e.g., sporting goods, jewelry, home furnishings, women's clothing, men's shoes, etc.), products that may be grouped on the basis of various other attributes of the products, etc. In some such embodiments, the GUI provided by the MSPR service 105 may include various user-selectable controls (e.g., menu options, drop-down lists, buttons, hyperlinks, check-boxes, radio buttons, text fields, search fields, etc.) that enable a user to interactively specify one or more particular subgroups, such as one or more controls that enable the user to select and/or otherwise indicate one or more particular categories, departments, item attributes, or other criteria by which to limit the product recommendations. In at least one embodiment, the GUI may provide functionality that enables a user to specify one or more search terms which may be used to define a particular subgroup of products, such as a subgroup of products that includes products of the retailer 130 that matches one or more of the specified search terms.

The example retailer 130 may include one or more retailer businesses that sell or otherwise make products or other items available to customers or potential customers, such as via a Web site (e.g., a Web store) or other network-based service hosted on one or more server computing systems. For example, the users 140 may access a Web site of the retailer 130 to obtain one or more Web pages, such as to view information about, search for, browse for, rate, place an order for, and/or provide information for completing a purchase of or a return of one or more products or other items available from the retailer 130. In at least some such embodiments, information about various of the interactions of the users 140 with the Web site of the retailer 130 may be collected and included as part of the user interaction information 115, such as interactions of the users that are related to the products or other items made available by the retailer 130 on the Web site (e.g., product views, purchases, returns, ratings). In addition, in some embodiments, the retailer 130 may also make products or other items available for customers at one or more physical retail locations (i.e., "brick and mortar" stores), whether in addition to or instead of via a Web store or other network-based service, and if so information regarding purchases, returns, and/or other activities of customers related to the products or other items available at the physical retail locations may also be collected for inclusion as part of the user interaction information 115. In addition, in some embodiments, the user 140 may be at a physical retail location and interacting with a GUI on a device at the physical retail location (e.g., a fixed-location kiosk provided by the retailer 130, a mobile wireless device belonging to the user or the retailer, etc.) in order to view and interact with recommendations from the MSPR service 105, as well as product information and related content from the retailer 130.

In some embodiments, the MSPR service 105 may be included as part of a Web site of a particular retailer 130, such as to provide the described functionality for dynamically recommending products of the retailer 130 to users of the Web site. For example, in some such embodiments, the GUI of the MSPR service 105 may be provided as one or more Web pages of the Web site, or as an embedded Web application included in one or more of various Web pages of the Web site. In some such embodiments, the users 140 may initiate access with the MSPR service 105 via the Web site of the retailer 130 in various ways to obtain an initial generated group of selectable product recommendations. For example, in some embodiments, the user may select one or more products available on the Web site (e.g., from a product page, a product listing, a search results list, etc.), with an initial generated group of product recommendations being related to the one or more selected products; the user may indicate a desire to browse a group of recommended products of a particular type and/or category, with the initial generated group of product recommendations being products of that particular type or category; the user may enter one or more search terms for recommended products, with the initial group of recommended products being products that match one or more of the search terms; etc.

In addition, in some embodiments, the MSPR service 105 may provide product recommendations for products available from multiple retailers 130. For example, in some such embodiments, the MSPR service 105 may obtain product information 120 from multiple retailers 130 and/or use user interaction information 115 based on how prior customers of the multiple retailers interacted with products provided by the multiple retailers. In some such embodiments, the MSPR service 105 may or may not be affiliated with one or more of the multiple retailers.

For illustrative purposes, some embodiments are described below in which specific types of recommendation strategies are combined and otherwise used in specific manners to provide users with specific types of recommendations for specific types of products in specific types of situations. These examples are provided for illustrative purposes and are simplified for the sake of brevity, and the inventive techniques may be used in a wide variety of other situations, some of which are discussed below, with the techniques not being limited to use with particular types of products or more generally with particular types of items, particular types of user interfaces or other mechanisms for interacting with users or otherwise using generated product recommendations, etc. For example, in some embodiments, the described techniques may be used to provide recommendations of entities (e.g., people, businesses or other organizations, etc.) or other things other than products or other items, may be used to generate recommendations for users without interacting with those users (e.g., by interacting with one or more other services or organizations that directly interact with those users), may be used to generate recommendations to be provided to entities other than users (e.g., organizations or other groups), etc.

FIGS. 2A-2D illustrate examples of dynamically generating and providing product or other item recommendations to users. In particular, FIGS. 2A-2D illustrate examples of a GUI that may be provided by some embodiments of the MSPR service 105 of FIG. 1 as part of dynamically generating recommendations for users in accordance with various of the described techniques. In the illustrated example of FIGS. 2A-2D, the GUI displays user-selectable information about numerous recommended products or other items available from one or more retailers, and dynamically updates the display with newly generated recommendations for products or other items as the user makes successive selections of particular displayed recommended products or other items, such as during an ongoing interactive recommendation exploration session.

Figure 2A:
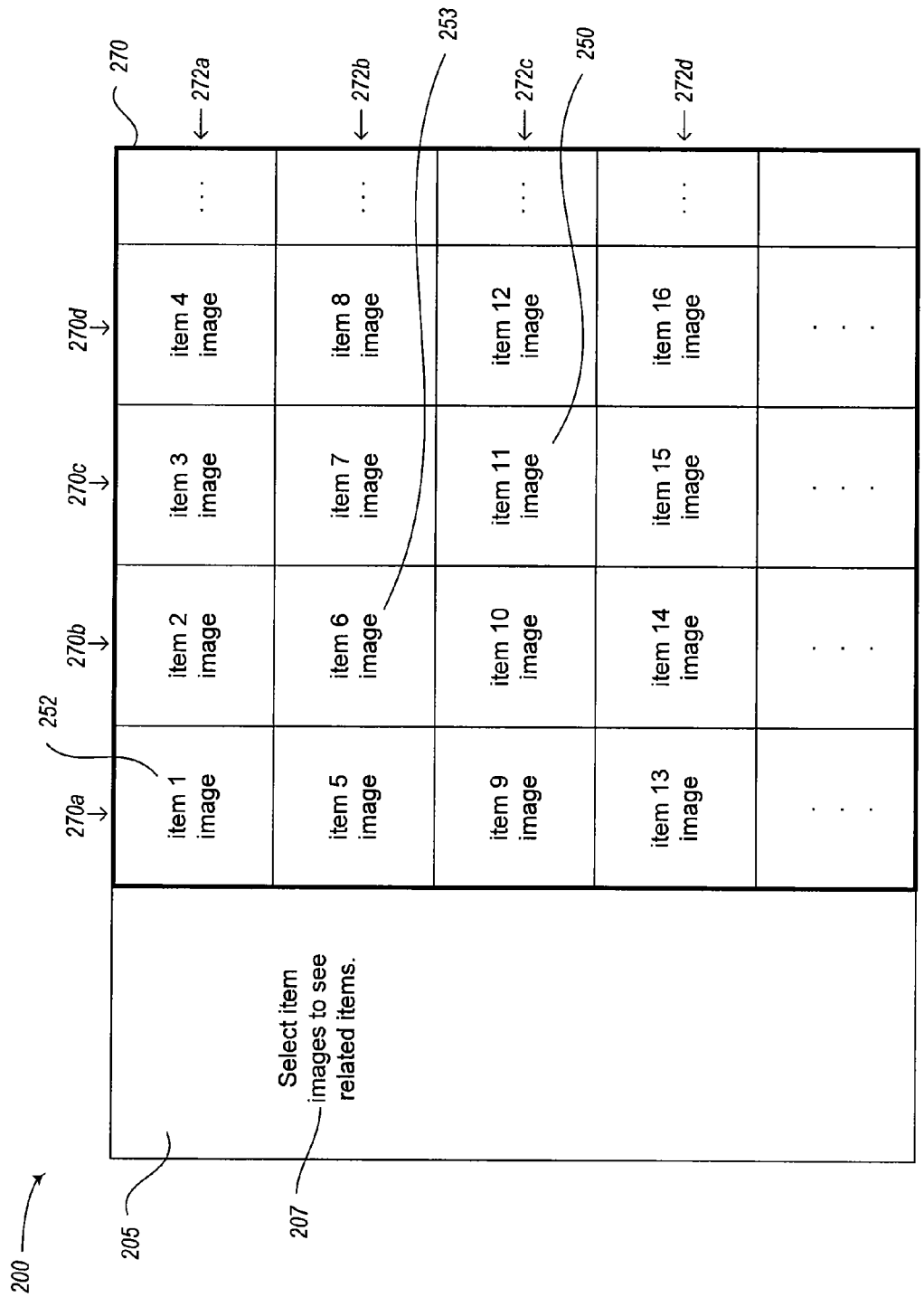
FIGS. 2A-2D illustrate examples of dynamically generating and providing product recommendations to users.

In the example of FIG. 2A, an example interactive display 200 is illustrated that includes user-selectable information related to multiple recommended products or other items available from an example retailer. The display 200 includes a selected item area 205, which in this example initially displays a user instruction 207 to the user. The display 200 also includes multiple item images displayed in a recommended item area 270 (shown surrounded in bold for reference purposes), with each of the item images corresponding to a distinct product or other item recommended for the user by an embodiment of the MSPR service (not shown). In this example, each of the displayed item images in the recommended item area 270 is selectable by the user, such that the user may select a displayed image of a particular recommended item to indicate an interest in other items that are similar to or otherwise related in various ways to the selected recommended item. For example, a user may select one of the item images displayed in the recommended item area 270 by "clicking on" the item image (e.g., using a mouse or other pointing device), or by otherwise interacting with the display 200 in such a manner to indicate a selection of the item image (e.g., using a moveable highlight, voice commands, a touch screen, etc.).

In the example display 200, the multiple item images are presented in a grid-like manner, with each item image being displayed in a particular grid location of the recommended item area 270, such as by being part of one of multiple illustrated rows 272a-272d and one of multiple illustrated columns 270a-270d, although the row and column indications are not displayed to the user in this example. To facilitate discussion of particular grid locations corresponding to a particular row and a particular column position, such grid locations may be abbreviated in [row]:[column] form in the following discussion—for example, the grid location at row 272a and column 270a (corresponding in this example to an image of item 1) may be abbreviated using such a form as 272a:270a. While the recommended item area 270 is illustrated as displaying a four-by-four grid of item images in this example, it will be appreciated that other types of displays are possible in other embodiments. For example, in some embodiments, more or fewer rows or columns may be included in the grid, with at least one embodiment having five rows and nine columns; while in other embodiments, item images may be presented in other manners not limited to grids (e.g., a list). In addition, in other embodiments, other information corresponding to the recommended items may be provided in the recommended item area 270, such as in addition to or instead of item images, including other visual representations of items (e.g., icons), item names, item descriptions, item prices, etc. Furthermore, in some embodiments, the various item images, icons, and/or descriptions may be illustrated in a non-uniform manner, such as with at least some more relevant items having higher associated relevance scores being displayed in a larger form than at least some less relevant items, such as to increase the prominence of the more relevant items.

In this illustrated embodiment, the item images displayed in the recommended item area 270 are presented in a particular order according to associated relevance scores of the corresponding recommended items (e.g., relevance scores determined for the recommend items based on one or more recommendation strategies used to identify the recommended items), although the particular associated relevance scores are not shown. For example, in this embodiment, item images corresponding to recommended items with higher scores are displayed more prominently than item images corresponding to recommended items with lower scores by being placed in a higher row (e.g., item images displayed in row 272a have relevance scores higher than and/or equal to item images displayed in row 272b, which have relevance scores higher than and/or equal to item images displayed in row 272c, and so on). In addition, within each row, an item image corresponding to a recommended item with a higher score is displayed more prominently than item images corresponding to recommended items having lower and/or equal relevance scores by being placed in a column farther left (e.g., within a particular row, the item image displayed in column 270a has a relevance score higher than or equal to the item image displayed in column 270b, which has a relevance score higher than or equal to the item image displayed in column 270c, and so on). As such, in this illustrated example, an item image corresponding to a recommended item with a highest determined relevance score is displayed in the grid location 272a:270a, which in this example is currently an item 1 image 252. In other embodiments, the item images displayed in recommended item area 270 may be ordered in other manners according to corresponding relevance scores, such as in a series of spirals (e.g., in a manner similar to the arms of a spiral galaxy), with the distance from the center and/or the particular spiral/arm indicating one or more types of information about the items (e.g., with the items closest to the center having the highest associated relevance scores, and with the different spirals/arms optionally corresponding to grouping of items by other attributes); such as in concentric rings of various geometric shapes, with the distance from the center and/or the particular ring indicating one or more types of information about the items (e.g., with the rings closest to the center having the items with the highest associated relevance scores); etc., and more prominent items may be illustrated in manners other than based on display location (e.g., by size of image, use of different fonts, etc.).

As previously noted, in the example of FIG. 2A, the recommended item area 270 currently includes multiple item images that are each associated with a recommended item determined for the user by the MSPR service, such as by being part of an initial group of recommended products. Such an initial group of recommended products may be generated and provided for current display to the user based on the user having initiated access to an interactive recommendation exploration session provided by the MSPR service GUI in various manners, such as by having interacted with a Web site of a retailer providing such functionality, or by otherwise interacting directly with the MSPR service. For example, the user may have interacted with a Web site of the retailer in such a way as to obtain an initial group of recommendations related to a particular subgroup of one or more products available from the retailer (e.g., one or more particular products selected by the user on the retailer's Web site; a group of recommended products of a particular type and/or category that the user selects to browse; one or more products that are the result of a search by the user; etc), while in other embodiments, the user may have interacted with the Web site of the retailer to obtain an initial group of recommendations that are not limited to a particular subgroup (e.g., such as to obtain recommendations for products that are generally available from the retailer, such as the top sellers of the retailer). One or more of various recommendation strategies may be used in various embodiments to identify or otherwise determine an initial group of product recommendations from products available from the retailer, whether applied to a particular subgroup of one or more products or more generally to all products available from the retailer, with at least some of the identified recommended items of the initial group being provided for display to the user. At least some of the various recommendation strategies that may be used are described in more detail below, and the one or more recommendation strategies used to determine the initial group may be selected for such use in various ways, such as by using one or more pre-selected or configured recommendation strategies in a particular situation and/or by dynamically determining one or more strategies to use in a particular situation. In addition, in at least some embodiments, one or more initial recommendation strategies may be chosen for recommending products for a particular user based on various preferences of the particular user (e.g., such as preferences to use one or more recommendation strategies) and/or other information associated with the user.

For example, the initial group of product recommendations may be generated by the MSPR service using various recommendation strategies to identify products that may be of potential interest to the user, some of which may be based on previous interactions of multiple users with various of the products available from the retailer. Such recommendation strategies may include identifying products that are determined to be popular based on the interactions of multiple customers of the retailer (or other users), such as to identify products that are frequently purchased by (e.g., top selling items), frequently viewed by, frequently searched for by, highly rated by, etc., the multiple customers. In some embodiments, recommendation strategies that identify popular items may be constrained to one or more time periods, such as to identify items that are recently popular, historically popular, popular at various times of the year, etc. As part of identifying products using a recommendation strategy, the MSPR service may also assign a relevance score to each of the identified items for use in various ways, such as for determining which items to provide for display to the user (e.g., the MSPR service may provide items with the highest relevance scores for display to the user), for displaying items to the user in various manners according to the relevance scores, for aggregating results of multiple recommendation strategies, etc. For example, with respect to recommendation strategies that identify popular items, the corresponding relevance score of each recommended item may be based at least in part on a level of popularity the items are determined to have (e.g., for top selling items, the relevance score may be based on a number of units of each item that have been recently sold to customers, such that items with the highest numbers of units sold have the highest relevance scores; for top viewed items, the relevance score may be based on a number of distinct users who viewed information related to the item; etc.). In other embodiments, the relevance scores may also or instead be based at least in part on a determined conditional probability that the recommended product will likely be purchased by the user if displayed in the current context of display 200, etc. The corresponding relevance scores produced by each distinct recommendation strategy may be normalized for comparison to and/or combination with relevance scores produced by other distinct recommendation strategies.

For the purposes of illustration, in this example, the user may have initiated access to functionality of the MSPR service by selecting to browse recommended items in a particular product category (e.g., products available in a particular department of the retailer), with the initial group of product recommendations provided for display in the recommended item area 270 being determined using a recommendation strategy that identifies recent top selling products within that particular product category. In this illustrated embodiment, images associated with item 1 through item 16 (displayed in the recommended item area 270) correspond to recommended products determined by the MSPR service using an initial recommendation strategy (e.g., the top selling items with the category). Furthermore, a corresponding relevance score has been determined for each of the recommended products in the initial group, such that item images corresponding to the recommended products may be appropriately displayed according to such relevance scores in the recommended item area 270, with a recommended product corresponding to the item 1 image 252 (currently displayed in grid position 272a:270a) having a highest relevance score, with a recommended product corresponding to the item 2 image at grid position 272a:270b having the next highest relevance score (or a relevance score equal to that of item 1), and so on. It will be appreciated that in other embodiments and/or in other situations, the user may have initiated access to functionality of the MSPR service in various other ways, one or more other or additional recommendation strategies may be used, and/or relevance scores may be determined in one or more other manners.

Figure 2B:
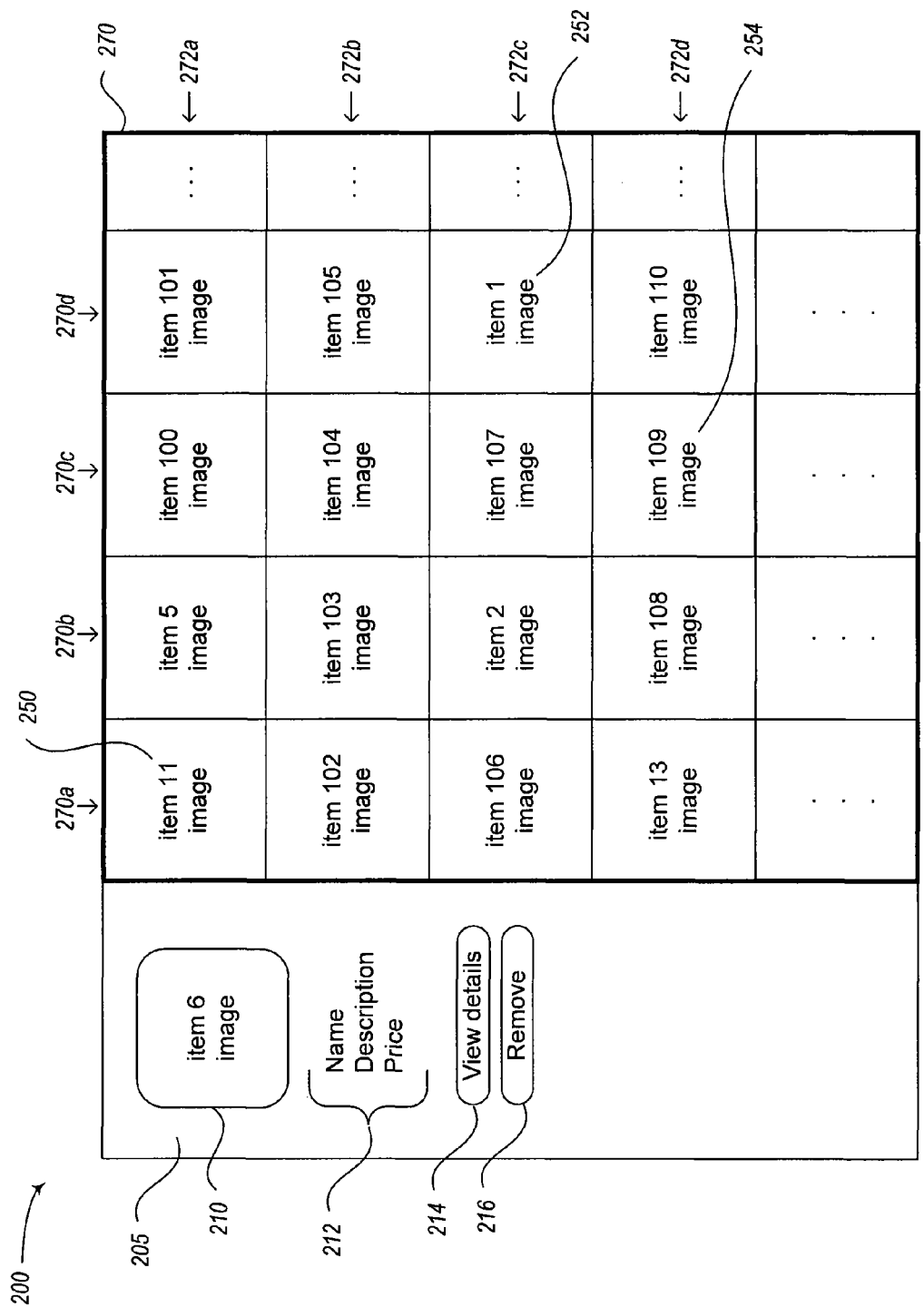

At some time after the multiple item images corresponding to the first group of recommended products is displayed to the user in the recommended item area 270 of FIG. 2A, the user interacts with the display 200 to select item 6 image 253 at grid position 272b:270b, such as to indicate an interest in item 6 and/or in items related to item 6, with the results of the selection being illustrated in FIG. 2B. In particular, in the modified display 200 of FIG. 2B, multiple item images corresponding to a new second group of products recommended for the user are currently being displayed in the recommended item area 270, with the second group of recommended products having been generated by the MSPR service in response to the user selection of item 6. Information related to the selected item 6 is now displayed in the selected item area 205, such as to indicate that item 6 is a currently selected product of the user. For example, in this illustrated example, the information related to the selected item 6 includes item 6 image 210 and various product information 212 (e.g., product name, description, price), as well as user-selectable control 214 that may be selected by the user to view additional information related to the item 6 (and optionally to initiate a purchase of the item 6), and user-selectable control 216 that may be selected by the user to de-select or otherwise remove the item 6 from being a currently selected item (e.g., if the recommended items of the second group, which are based in part on item 6 being a currently selected item, are determined by the user to be less relevant than the recommended items of the first group or otherwise to not be of sufficient interest to the user). In other embodiments, other information and user-selectable controls related to the currently selected item may be shown in the selected item area 205, such as to also have user-selectable controls via which the user may initiate a purchase of the currently selected item, rate or otherwise provide feedback regarding the currently selected item, etc.

In this example, the new group of recommended products may be generated by aggregating results of the recommendation strategy used to identify the initial group of recommended products (e.g., recent top selling items within a particular category) with results of one or more recommendation strategies that identify products that are similar to or otherwise related to the currently selected product item 6. In various embodiments, various recommendation strategies may be used to identify products that are similar to and/or otherwise related to the currently selected product, some of which may be based on prior interactions of multiple users with the various products of the retailer. For example, in some embodiments, such recommendation strategies may include identifying products that have frequently been viewed by users who also viewed the currently selected product; identifying products that have frequently been purchased by users who also viewed the currently selected product; identifying products that have frequently been purchased by users who also purchased the currently selected product; etc. As previously noted, as part of identifying products using a recommendation strategy, the MSPR service may assign a relevance score to each of the identified products. For example, with respect to recommendation strategies for identify products that are similar to or otherwise related to a particular product, the corresponding relevance score of each recommended item may be based at least in part on a determination of how similar or otherwise related the products are (e.g., items that have been viewed or purchased more frequently by users who also viewed or purchased the currently selected item may be assigned higher relevance scores than items that have been viewed or purchased less frequently by such users; items that are more likely to be viewed or purchased by users who also viewed or purchased the currently selected item may be assigned higher relevance scores than items that are less likely to be viewed or purchased by such users; etc.). As previously discussed, the corresponding relevance scores may be normalized for comparison to and/or combination with relevance scores produced by other recommendation strategies in various manners.

In various embodiments, as part of generating the new group of recommended products for display to the user, the results of multiple recommendation strategies may be aggregated in various ways. For example, in some embodiments, the results of each of the distinct recommendation strategies may be merged, such that the products having the highest corresponding relevance scores determined by each distinct recommendation strategy are selected to be included in the new group of recommended products provided for display to the user (e.g., such as if the relevance scores are normalized or otherwise comparable to determine which are the more or less relevant). In some such embodiments, if the results of the recommendation strategies include commonly identified products (e.g., products that were identified by each of the recommendation strategies), then the associated relevance scores of a commonly identified product produced by each distinct recommendation strategy may be combined (e.g., added together) to produce a new relevance score for that product (such as a new relevance score for that product that is higher than the individual relevance scores determined for that product by each strategy), with the new relevance score being used to determine which products to provide in the new group of recommended products. In addition, in at least some embodiments, the relevance scores produced by a previously used recommendation strategy may be reduced, such as by multiplying the relevance scores produced by the previously used recommendation strategy by a weighing factor that is less than 1 ("one"), such that the reduced relevance scores have less influence when being aggregated with the results of a more recently used recommendation strategy. As one illustrative example, the new group of product recommendations provided for display to the user in the illustrated display 200 of FIG. 2B may be generated based on aggregating results of a new recommendation strategy that identifies products that are related to the currently selected product (item 6) with the results of the initial recommendation strategy used to identify the initial group of recommended products (e.g., recent top sellers), with the previous results of the initial recommendation strategy being reduced as part of the aggregation (e.g., by using a weighting factor).

As previously noted, in the illustrated example of FIG. 2B, as a result of the user having selected the item 6, a new group of multiple item images are currently provided in the recommended item area 270, with each item image corresponding to products recommended for the user by the MSPR service. In particular, as a result of the user's selection, a number of new item images are displayed in the recommended item area 270 (e.g., item images corresponding to items 100-110), with each new item image corresponding to a recommended item that was newly identified by the aggregated recommendation strategies, or otherwise determined by the aggregated recommendation strategies to have a sufficiently high relevance score to be included in the second displayed recommendation group. In addition, a number of previously displayed item images from the first recommendation group of FIG. 2A (i.e., images for items 11, 5, 2, 1 and 13) are currently displayed in the recommended item area 270, with at least some of these item images being displayed in a different grid location than they were displayed in FIG. 2A prior to the selection of item 6, such as based on newly determined relevance scores for at least some of the recommended items corresponding to such item images as part of their inclusion in the second group. Conversely, several other item images that were previously displayed in FIG. 2A prior to the user selection of item 6 are no longer part of the second recommendation group displayed in the recommended item area 270 of FIG. 2B. For example, as a result of determining the new second group of recommended products (based on the aggregated recommendation strategies), item 1 image 252 that was previously displayed in FIG. 2A as the most relevant item prior to the selection of item 6 is now displayed in FIG. 2B in a position of less relevance at grid position 272c:270d, while previously displayed item 11 image 250 is now displayed most prominently in the grid position 272a:270a.

Figure 2C:
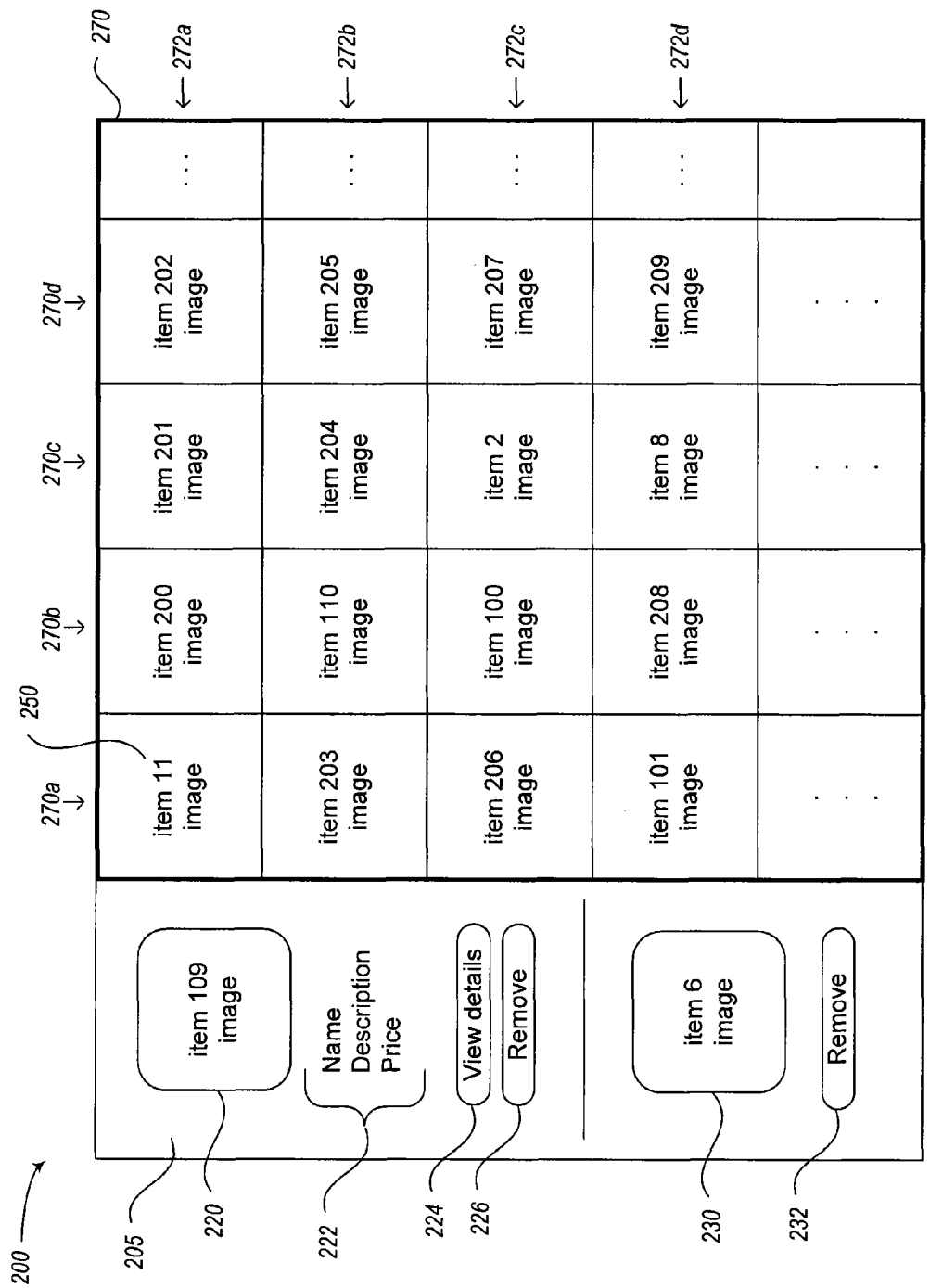

At some time after the multiple item images corresponding to the new second group of recommended products is displayed to the user in recommended item area 270 of FIG. 2B, the user interacts with the display 200 to select item 109 image 254 at grid position 272d:270c, such as to indicate an interest in item 109 and/or in items related to item 109, with the results of the selection being illustrated in FIG. 2C. In particular, in the modified display 200 of FIG. 2C, multiple item images corresponding to a new third group of products recommended for the user are currently being displayed in recommended item area 270, with the third group of recommended products having been generated by the MSPR service in response to the user selection of item 109. Information related to the selected item 109 is now displayed in the selected item area 205, such as to indicate that item 109 is a currently selected product of the user, such as along with item 6. For example, in this illustrated embodiment, the information related to the selected item 109 includes item 109 image 220, and various product information 222, as well as user-selectable control 224 to obtain additional information related to item 109, and user-selectable control 226 to de-select or otherwise remove the item 109 from being a currently selected item. Information related to the item 6 is now being displayed in a new location in the selected item area 205, such as item 6 image 230, and user-selectable control 232 to de-select or otherwise remove the item 6 from being a currently selected item. In this example, control 214 and information 212 for item 6 do not have counterpart controls and information displayed for item 6 in FIG. 2C, although in other embodiments such controls and information may continue to be displayed.

In this example, the new third group of recommended products may be generated by aggregating results of the recommendation strategy used to identify the initial group of recommended products (e.g., recent top selling items within a particular category), results of the previously used recommendation strategy to identify products that are similar to or otherwise related to the selected item 6, and results of a recommendation strategy that identifies products similar to or otherwise related to the selected item 109 (whether the same recommendation strategy as used for item 6, or a different recommendation strategy). For example, in some embodiments, the relevance scores associated with aggregated results of the prior two recommendation strategies (e.g., the initial strategy and the strategy used with respect to item 6) as part of the second recommendation group may be reduced (such that relevance scores initially associated with items of the first group may have been reduced twice), and then combined with results of the recommendation strategy used to identify products similar to or otherwise related to the selected item 109, such as in a manner similar to that described above. Thus, in this manner, the recommended products of the third recommendation group are in this example based on a combination of the group of multiple currently selected items displayed in the selected item area 205. In other embodiments, the current item selection and corresponding determination of recommended items may be performed in other manners, such as to allow only a single currently selected item (e.g., to discard recommended items from the second group related to item 6 after item 109 is selected), to determine recommendations for a group of multiple currently selected items in other manners (e.g., to generate a completely new third group of recommended items that does not explicitly incorporate any of the recommended items of the second group, but that may be generated based on a combination of the multiple currently selected items of the current group; to not reduce the weights of items recommended based on an earlier selected item of the current group; etc.), etc.

The multiple item images currently provided in the recommended item area 270 of FIG. 2C each correspond to a recommended product from the new third group of products recommended for the user by the MSPR service, with the item images being displayed in accordance with the relevance scores determined for the third group. In particular, a number of new item images are displayed in the recommended item area 270 (e.g., item images corresponding to items 200-209) along with a number of previously displayed item images (e.g., images for items 11, 110, 100, 2, 101 and 8). Several of the previously displayed item images are now being displayed in FIG. 2C in different grid positions than prior to the user selection of item 109, and many other of the previously displayed item images are no longer displayed in the recommended item area 270, such as based on newly determined relevance scores of the recommended items for the third group. In this illustrated example, item 11 image 250 is still displayed in the most prominent grid position 272a:270a, such as based on the corresponding item 11 still having a highest corresponding relevance score, but previously displayed item 1 image (e.g., item 1 image 252 of FIGS. 2A and 2B) is no longer included in the recommended item area 270.

Figure 2D:
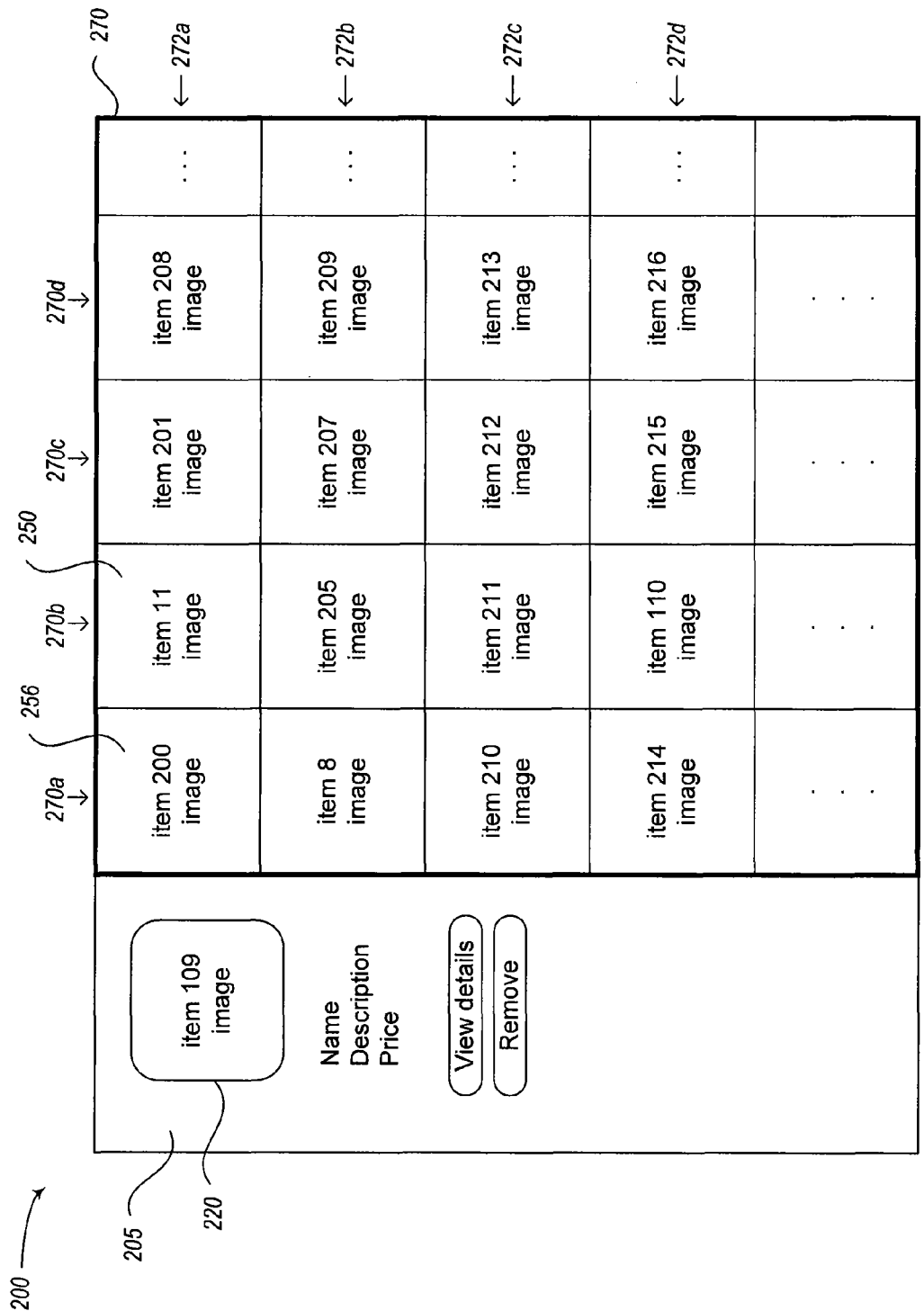

FIG. 2D continues the example of FIG. 2C, and in particular illustrates a modified display 200 after the user has de-selected item 6 from the selected item area 205 (such as by interacting with the user control 232 in FIG. 2C). As one result of the user having de-selected item 6, the selected item area 205 in FIG. 2D no longer includes information related to item 6, although information related to item 109 is still present (e.g., item 109 image 220). In addition, in the example of FIG. 2D, the de-selection of item 6 has initiated the determination of a new fourth group of recommended items for the user by the MSPR service. Accordingly, multiple item images corresponding to the new fourth group of recommended products are currently being displayed in the recommended item area 270 of FIG. 2D. For example, in such an embodiment, the new fourth group of recommended products may be generated by aggregating results of the recommendation strategy used to identify the initial group of recommended products (e.g., recent top selling items in a category) and the results of the recommendation strategy used to identify products that are similar to or otherwise related to the selected item 109, but without including the previously used recommendation strategy used to identify items that are similar to or otherwise related to item 6. In addition, in some embodiments, after a user de-selects an item, the MSPR service may reduce the relevance scores of items that are determined to be similar to the de-selected item, such as to lessen the influence of any such items that may be identified by the remaining recommendation strategies.

In this illustrated example, each of the multiple item images currently displayed in the recommended item area 270 corresponds to a recommended product from the resulting new fourth group of products recommended for the user by the MSPR service, with the item images being displayed in accordance with relevance scores of the corresponding recommended products for the fourth group. In particular, in this example, as a result of the de-selection, recommended product item 200 has now been determined to have a highest relevance score, and as such, the corresponding item 200 image 256 is now displayed in the position of highest prominence in area 270 (in grid position 272a:270a).

In other embodiments, various other functionality may be provided by an embodiment of the MSPR service, such as for display in a GUI of the MSPR service. For example, in some embodiments, a user may interact with various information corresponding to a displayed recommended product to provide feedback with respect to that product, such as to provide positive and/or negative ratings with respect to the displayed recommended product (e.g., a numerical rating, a star rating, a thumbs-up/down rating, etc.), with such feedback being used in various ways in various embodiments, such as to reduce (if a negative rating) and/or increase (if a positive rating) the relevance scores for products that are determined to be similar to or otherwise related to the rated displayed recommended product. In addition, in some embodiments, the users may interact with the displayed images in various other ways to obtain and/or view information related to recommended products, such as by "hovering" over a displayed image of a recommended product (e.g., with a mouse pointer) to cause information related to a recommended product associated with the displayed image to be provided to the user (e.g., price, description, sales information, availability, etc.). In still other embodiments, functionality may be provided that allows the user to interact with the GUI to initiate a purchase of a displayed recommended item. In addition, in some embodiments, information may be displayed or otherwise provided to users to indicate why a particular item is being recommended (e.g., this particular item is highly relevant for being viewed by users who also viewed currently selected item 109, and is moderately relevant for being a top seller for an initially selected category of items).

While not illustrated here, it will be appreciated that a user may continue to interact with the display 200 in the manner previously discussed with respect to FIGS. 2A-2D, such as to participate in much longer series of selections of recommended items, and to have much more than 2 currently selected items of interest. In addition, in other embodiments, multiple users (e.g., of a group) may interact with a display 200 or other GUI, whether simultaneously or consecutively, and whether on one or more client devices, such as to display recommended items that are based on multiple currently selected items that have been indicated by multiple users.

In addition, as discussed in greater detail elsewhere, various other recommendation strategies may be used in addition to and/or instead of the recommendation strategies discussed with respect to the examples of FIGS. 2A-2D.

In addition, while not illustrated with respect to the examples of FIGS. 2A-2D, in some embodiments multiple currently selected items (e.g., multiple items displayed in the selected item area 205) may be related in manners other than being consecutively selected by a user as alternatives based on successive similarity to each other, and corresponding recommended items (e.g., items displayed in the recommended item area 270) for the multiple currently selected items may be determined by an embodiment of the MSPR service in various manners. For example, the multiple selected items may be selected as a collection of items related to each other by being complementary or otherwise designated as possibly belonging together (e.g., an outfit that includes pants, a shirt, and shoes that are intended to be worn together), whether based on a manual designation by one or more users or an automated designation by the MSPR service or other automated system. As one specific example, a user interacting with a GUI similar to that displayed in FIGS. 2A-2D may individually select each of the items as part of specifying a collection of multiple items of interest to possibly purchase together, or in other embodiments the user may be provided with and select one of multiple recommended collections that each includes a distinct combination of multiple related items (e.g., distinct combinations of a shirt, pants, and shoes).

In such embodiments, the recommended items for a current collection of multiple selected items may be determined in various manners, such as to include other items that may be complementary to the current collection of items (e.g., one or more belts and/or socks that are complementary to a current collection of a particular shirt, pants and shoes), and/or to include recommended items that are similar to or otherwise related to one or more of the selected items of the current collection. For example, the recommended items may include other pants related to the currently selected pants of the current collection (or other related items, such as skirts related to women's pants of the current collection), other shirts related to the currently selected shirt of the current collection, and/or other shoes related to the currently selected shoes of the current collection. Alternatively, the recommended items may include, for example, other pants that are related to multiple or all of the currently selected pants, shirt and shoes of the current collection, and/or other types of items (e.g., other shirts, other shoes, etc.) that are related to multiple or all of the currently selected pants, shirt and shoes of the current collection. As discussed in greater detail elsewhere, such items that are related to other items may be determined in various manners in various embodiments, such as by being similar to each other (e.g., with respect to one or more item attributes); by users previously interacting with the related items in similar manners (e.g., based on doing one or more of viewing, purchasing, searching for, browsing for, etc. for each of the related items), possibly at similar times (e.g., during a single interaction session); by being designated by one or more users as being related; etc.

In such situations, the various types of determined recommended items may be displayed in various manners and at various times, such as simultaneously in an interspersed manner (e.g., based on associated relevance scores with respect to all of the currently selected items of the collection, such as to first show a particular shirt that has the highest aggregate relevance score with respect to the selected pants, shirt and shoes of the current collection, to next show particular shoes that have the second highest aggregate relevance score with respect to the selected pants, shirt and shoes of the current collection, etc.), may be displayed simultaneously but separately (e.g., with a first row of a grid showing recommended pants, a second row of the grid showing recommended shirts, etc.), may be displayed at different times (e.g., if the pants of the current collection is designated by the user, having the grid include recommended items corresponding to those pants, and having the grid change to show recommended items corresponding to the shirt of the current collection after the user designates that shirt rather than those pants), etc.

Furthermore, when the user selects a recommended item in such situations, the MSPR service may take various types of actions. For example, if the user selects a new complementary type of item (e.g., a belt), the new item may be added to the current collection of multiple selected items, such that the new current collection includes the selected pants, shirt, shoes and belt. Alternatively, if the user selects a new recommended item that is related to one of the currently selected items of the current collection (e.g., a new pair of pants or skirt that is recommended based on being related to the currently selected pants of the current collection), the new selected item may instead replace the previously selected item to which it relates in a modified version of the collection.

In addition, when the user selects a new recommended item for the current collection, whether to replace a previously selected item of the collection or to add to the current collection in addition to the previously selected items, a new group of recommended items is determined to reflect the new current collection of multiple items. For example, if new recommended pants are selected for the collection, the new group of recommended items may, for example, replace previously recommended pants and other related items (e.g., skirts) with new recommended pants and/or other items that are similar to or otherwise related to the newly selected pants, but without modifying previously recommended items of other types (e.g., shirts and shoes). Alternatively, if the various recommended items are determined based on their relationship to all of the multiple selected items of the current collection (e.g., if the recommended items are determined based on their relationship to not only the currently selected pants but also to the currently selected shirt and shoes of the current collection), the new group of recommended items after the selection of the new pants may instead be determined based on all of the items of the current collection. Such determination of the new group of recommended items may include, for example, the following: removing the items and relevance scores that were previously determined based on the previously selected pants that are no longer part of the new current collection; retaining the other items that were previously recommended based on the previously selected items of the collection (e.g., the currently selected shirt and shoes), optionally without reducing any corresponding relevance scores; determining additional recommended items based on the newly selected pants of the new current collection, along with corresponding relevance scores; and combining the retained items and retained relevance scores with the new additional recommended items and new relevance scores in a manner similar to that discussed elsewhere. It will be appreciated that collections of multiple items may be selected and that recommended items for a current collection of multiple selected items may be determined and displayed in other manners in other embodiments.

Figure 3:
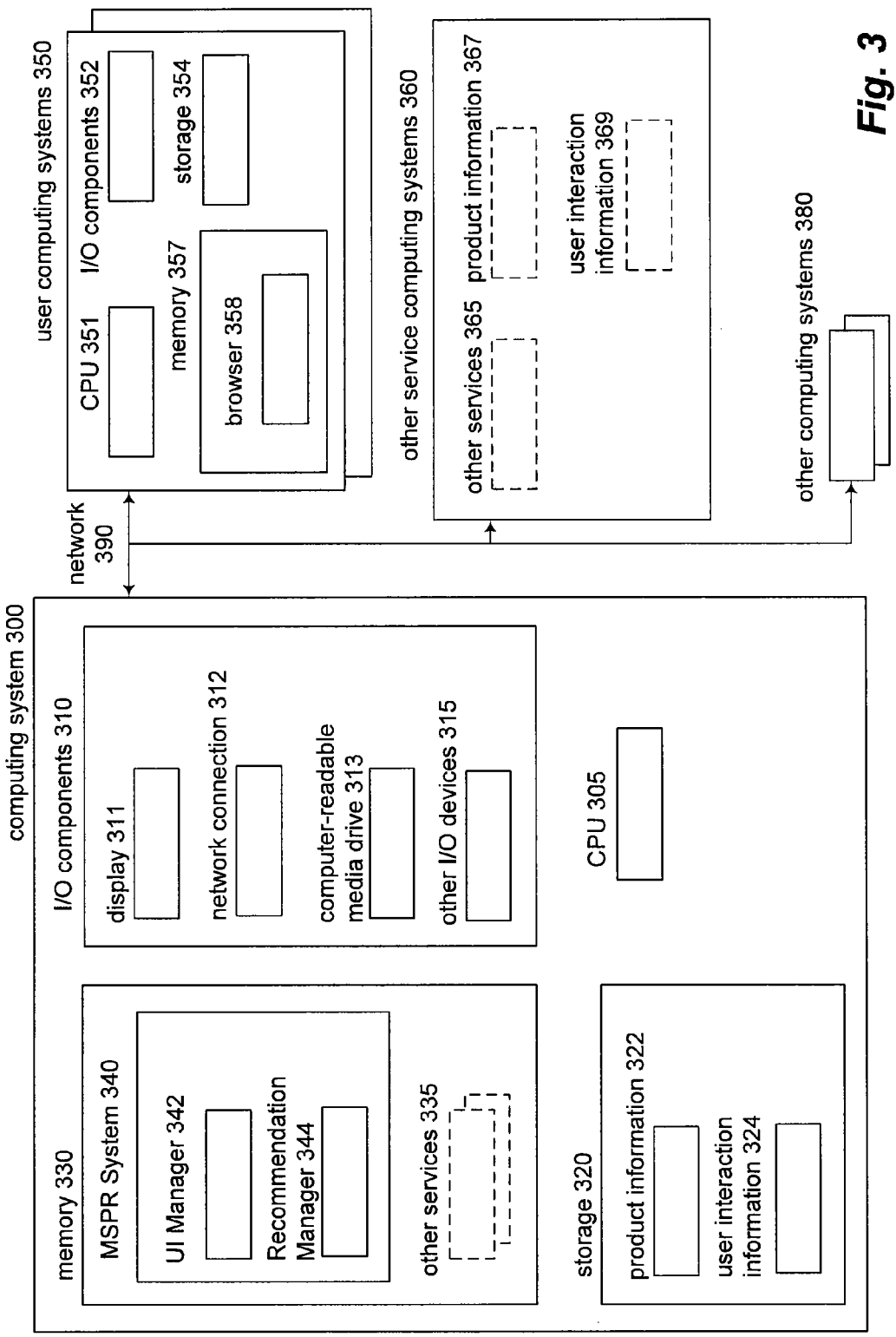
FIG. 3 is a block diagram illustrating example computing systems suitable for executing a multi-strategy product recommendation system for dynamically generating product recommendations for users.

FIG. 3 is a block diagram illustrating an example embodiment of a multi-strategy product recommendation system for performing techniques to dynamically generate product recommendations or other item recommendations for users. In particular, FIG. 3 illustrates a server computing system 300 suitable for executing an embodiment of a Multi-Strategy Product Recommendation ("MSPR") system 340, as well as various user computing systems 350, other optional computing systems 360 that optionally provide other services with which the MSPR system interacts, and other optional computing systems 380. In the illustrated embodiment, the server computing system 300 has components that include a CPU 305, various I/O components 310, storage 320, and memory 330. The illustrated I/O components include a display 311, a network connection 312, a computer-readable media drive 313, and other I/O devices 315 (e.g., a keyboard, a mouse, speakers, etc.). In addition, the illustrated user computing systems 350 have components similar to those of server computing system 300, including a CPU 351, I/O components 352 (although particular components are not illustrated), storage 354, and memory 357. The other computing systems 360 and 380 may also each include similar components to some or all of the components illustrated with respect to computing system 300, but such components are not illustrated in this example for the sake of brevity.

An embodiment of the MSPR system 340 is executing in memory 330, such as under control of configured CPU 305, and it may interact with computing systems 350, 360 and 380 over the network 390 (e.g., via the Internet and/or the World Wide Web, via a private cellular network, etc.). In this example embodiment, the MSPR system 340 includes functionality related to providing recommendations regarding products or other items to various users (not shown) who are interacting with user computing systems 350, such as in conjunction with an MSPR service provided or otherwise managed by the MSPR system 340. The information from the MSPR system may in some embodiments and situations be provided directly to the user computing systems 350, while in other embodiments the information may be provided indirectly by the MSPR system via one or more other services (e.g., optional other services 335, optional other services 365, etc.) that interact directly with the users, such as if the other services are online retailers or other types of services and the users are customers of the services.

The other computing systems 350, 360 and 380 may have various forms, and may be executing various software as part of interactions with the MSPR system. For example, user computing systems 350 may include various types of client devices (e.g., a desktop computing system, a portable computing system, a smartphone or other cell phone or other mobile device that includes appropriate communication and computing capabilities, etc.), and in the illustrated embodiment are shown executing a Web browser 358 or other software (e.g., a module of the MSPR system that is designed to execute on a client device) in memory 357 to interact with MSPR system 340. The Web browser 358 or other software on a user computing system 350 may, for example, interact with a User Interaction ("UI") Manager module 342 of the MSPR system to obtain information about recommended items in various ways, and may display or otherwise present (e.g., via a GUI of the MSPR system that is displayed to the user via one or more Web pages or other UI screens on the user computing system 350) some or all of that obtained information to enable the user to interact with or otherwise use that information in various manners (e.g., to obtain additional information about other recommended items that are progressively more relevant for the user based on prior selections of the user of other less relevant items, to initiate purchases or other acquisitions of particular items that are determined by the user to be of interest, etc.). In addition, one or more users of the user computing systems 350 may interact with MSPR system 340 to perform various other types of actions, as discussed in greater detail elsewhere.

In addition, as described in greater detail elsewhere, the MSPR system 340 may in some embodiments be integrated with or otherwise associated with one or more other services (e.g., online retailers or other retailers, item review services, databases or other services that provide information about items and/or about user interactions with items, etc.), and if so may interact with those other services in various manners. If so, one or more such other services may, for example, execute on computing system 300 as other services 335 in memory 330, and/or as one or more other services 365 that each execute on one or more of the other remote service computing systems 360. The interactions with the other services may include, for example, some or all of the following non-exclusive list: obtaining information about products and other items available from those services or otherwise about which the service has access to information, such as optional product information 367 on other service computing system 360; obtaining information about various types of prior interactions of customers and other users with the other services or otherwise about which the other services have access to information (e.g., to view information about items; to purchase items; to provide other types of feedback about particular items or relationships between items, such as that a particular item is regarded in a particular positive or negative manner, or that two or more items are similar to each other or are otherwise related in one or more manners; etc.), such as optional user interaction information 369 on other service computing system 360; etc. The MSPR system may obtain such information in various manners, such as by the MSPR system pulling such information from one or more other services periodically and/or on demand, by one or more other services pushing such information to the MSPR system periodically and/or as otherwise triggered (e.g., as soon as the information is available, such as to maintain a live feed so that the MSPR system has access to the most up-to-date available information), etc. After such information is obtained by the MSPR system, the MSPR system may then store such information for later use (e.g., in databases 322 and/or 324 on storage 320, or on one or more remote other computing systems 380), or in other embodiments may instead retrieve the information as needed and not maintain a local copy of the information. Various other information related to the operation of the MSPR system 340 may also be stored in storage 320 or elsewhere (e.g., information about users of the MSPR system, such as preference information; information about current interactions of users with the MSPR system, such as one or more related items that have been currently selected by the user as part of an ongoing interactive recommendation exploration session; etc.), but is not illustrated in this example.

After the MSPR system 340 receives requests (or other indications) to provide product or other item recommendations for a particular user, such as from the user or from another service on behalf of the user, the Recommendation Manager module 344 of the system 340 may dynamically determine recommendations for the user based on available information, such as the product information 322, user interaction information 324, any indications by the user of a subset of one or more items of initial interest (e.g., a product category, a particular item, one or some or all of the search results for a search performed by the user, etc.), any current selections by the user of one or more previously recommended items during an ongoing interactive recommendation exploration session, etc. In determining the recommendations, the module 344 may use various recommendation strategies in various manners, and may further determine relevance information for some or all of the recommended items with respect to the user or to any user (e.g., weighting information or other indications of relevance levels for some or all of the recommended items, such as absolute relevance scores, relative indications of higher or lower relevance with respect to other recommended items, etc.), as discussed in greater detail elsewhere. In other embodiments and situations, the Recommendation Manager module 344 may instead retrieve stored recommendation information that was previously determined, such as previously determined by the module 344 in a manner specific to the user or instead for all users (e.g., recommended items for a particular product category, recommended items for a particular selected item, etc.), and may use that stored information as is or may modify it to reflect a current user or other current situation. The Recommendation Manager module 344 may then use the determined recommendation information in various ways, such as by sending the information to another service that requested it for use by that other service, sending the information to a particular client device of the user to initiate a dynamic modification of other information previously displayed on the client device to the user as part of an ongoing interactive recommendation exploration session (e.g., to modify a displayed Web page without the client device doing a reload of the page, such as based on a previously sent and currently displayed version of the Web page that is based on Ajax technology or that otherwise includes executable client-side instructions that initiate or otherwise perform the modification), providing the information to the UI Manager module 342 for use by the module 342 (e.g., if the module 344 dynamically determined the information in response to a request from the module 342), etc.

If the UI Manager module 342 requested the recommendation information, it may then incorporate some or all of the recommendation information into a form to be provided to a user for display or other presentation, such as in one or more Web pages to be displayed on a client device of the user. Furthermore, if the Recommendation Manager module 344 determines weighting information or other relevance level indications for some or all of the recommended items, the Recommendation Manager module 344 and/or UI Manager module 342 may sort the recommended items based at least in part on those relevance indications, such that the recommended items with the highest associated relevance indications may be displayed first or otherwise more prominently than other recommended items with lower associated relevance indications. As discussed in greater detail elsewhere, in some embodiments, if a current group of new item recommendations is determined based at least in part on a user selection of one or more recommended items from a previously determined group, the UI Manager module 342 may further in some such embodiments incorporate newly included item recommendations together with some or all of the previous item recommendations, such that a Web page or other information provided by the UI Manager module includes both new and previous recommended items. In addition, when the new and previous recommended items have associated relevance scores, those relevance scores may be used to combine the new and previous recommended items as part of the new display in various manners, including by reducing the relevance scores previously associated with the previous recommended items (e.g., by a fixed amount, by a fixed percentage, etc.), and then sorting or otherwise managing the combination of the new and previous recommended items by their associated relevance scores as discussed elsewhere. The UI Manager module 342 may then provide the information for presentation to the user, such as by sending one or more Web pages to a client device of the user. In other embodiments and situations, the UI Manager module 342 may instead interact with one or more other services, such as if the information from the UI Manager module 342 is to be incorporated as part of a Web page or other UI screen provided by the other service (e.g., within a particular pane of a larger page or screen).

While not illustrated here, the MSPR system may further have other modules or associated functionality in other embodiments, such as to generate some or all of the user interaction information 324 (e.g., based on monitoring users' interactions with retailers or other services; based on retrieving and processing information from retailers or other services related to such interactions, such as to identify data to be used with particular recommendation strategies and/or to identify particular recommendation strategies based on automatically learned types of relationships between items; based on users' interactions with the MSPR system to select particular items or otherwise provide feedback specific to particular items and/or to relationships between particular items, such as based on series of selections of recommended items or in other manners; etc.), to generate some or all of the product information 324, etc. Additional details related to various operations of embodiments of the MSPR system and an associated MSPR service are included elsewhere.

It will be appreciated that computing systems 300, 350, 360 and 380 are merely illustrative and are not intended to limit the scope of the present invention. The computing systems/devices may instead each include multiple interacting computing systems or devices, and the computing systems/devices may be connected to other devices that are not illustrated, including through one or more networks such as the Internet, via the Web, or via private networks (e.g., mobile communication networks, etc.). More generally, a computing device or other computing system may comprise any combination of hardware or software that may interact and perform the described types of functionality, including without limitation, desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated MSPR system 340 may in some embodiments be distributed in additional modules. Similarly, in some embodiments some of the functionality of the MSPR system 340 may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
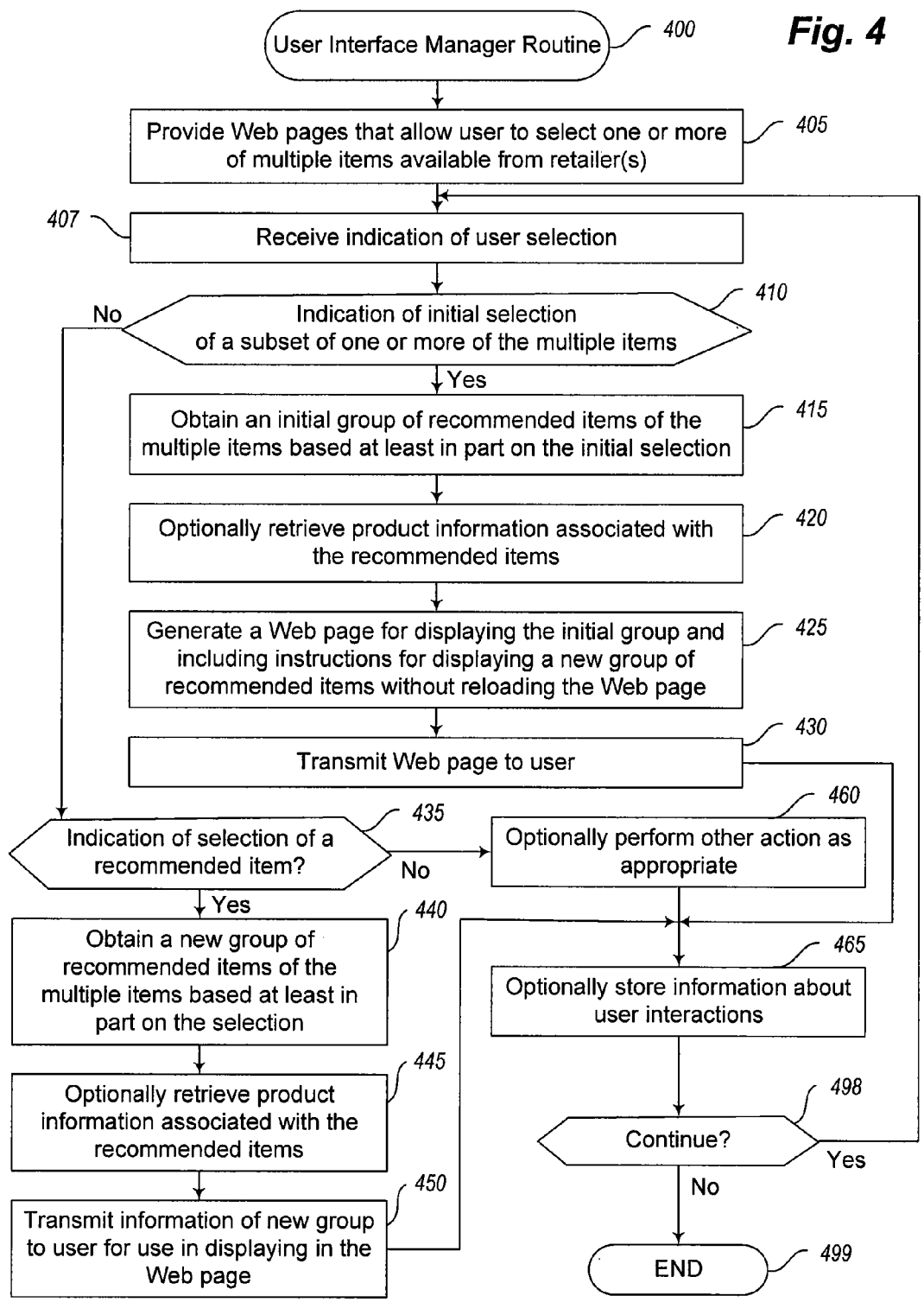
FIG. 4 is a flow diagram of an example embodiment of a User Interface Manager routine.

FIG. 4 is a flow diagram of an example embodiment of a User Interface Manager routine 400. The routine may, for example, be provided by execution of an embodiment of the User Interface Manager module 342 of FIG. 3 and/or otherwise as part of the MSPR service 105 of FIG. 1, such as to facilitate providing a GUI for display on a client device of a user that includes selectable information about recommended items available from one or more retailers, and facilitate updating the displayed GUI with newly generated recommended items as the user interacts with the displayed items. In addition, in some embodiments, portions of the routine may be executed by code executing in memory 357 on one or more of the user computer systems 350 of FIG. 3, with partial results being stored in the memory 357 and/or storage 354.

The illustrated embodiment of the routine begins in block 405, where the routine provides one or more Web pages for display on a client device of the user, with the Web page(s) enabling the user to select a subset of one or more of multiple items that are available from one or more retailers. As discussed elsewhere, in other embodiments the provided GUI may use UI screens other than via Web pages, or the routine may otherwise interact with users. In block 407, the routine receives an indication of a user selection or other interaction performed via the provided Web page(s). In other embodiments, the user selection or other interaction may instead be obtained in other manners, such as by having information about one or more items (e.g., a particular item, an item category, etc.) encoded in a URL that is selected by the user from a Web page that is not provided by the routine 400, or having such information otherwise provided by the user. In the illustrated embodiment, the routine then continues to block 410 to determine whether an indication of an initial selection of a subset of one or more of the multiple items has been received. As discussed elsewhere, such an initial selection may be based on, for example, an indication to browse a subset of the multiple items (e.g., by category, department), to search for an item (e.g., by name, type, description), to select a particular item, etc. If, in block 410, it is determined that an indication of an initial selection of such a subset was received, the routine proceeds to block 415 to obtain an initial group of recommended items from the multiple items available from the one or more retailers, based at least in part on the initial selection of the subset, such as by interacting with an embodiment of the Recommendation Manager routine 500 of FIGS. 5A-5B (described below) to request such an initial group along with information of the initial selection of the subset and to obtain the initial group of recommended items in response to the request.

In block 420, the routine then optionally retrieves product information associated with the initial obtained group of recommended items, such as product information that may be provided for display to the user. For example, in some embodiments, such product information may include images and/or various details related to the items (e.g., name, price, description, availability, etc). In various embodiments, the product information may be retrieved in various ways from various sources, such as directly from a retailer that provides the products (e.g., from a Web site of a retailer, from an accessible database of product information provided by a retailer of the product, etc.), from a local storage or database of such information, etc. In other embodiments, such product information may be included in the obtained group of recommended items, or may be obtained from other sources.

In block 425, the routine then generates a Web page for displaying the initial group of recommended items to the user, optionally along with some or all of the retrieved product information. In this illustrated embodiment, the Web page is generated to include instructions that, when executed on a client device of the user, enable the user's device to retrieve and display a new group of recommended items to the user in the displayed Web page without causing the Web page to be completely reloaded, such as in response to one or more user selections of recommended items. In addition, as discussed in greater detail elsewhere, the Web page may also be generated so as to display the recommended items in accordance with relevance levels associated with the items, such as to display recommended items that have higher relevance levels more prominently than recommended items that have lower relevance levels. In addition, the Web page may also in some embodiments include functionality to enable a client to interactively initiate a purchase of a recommended item, to obtain additional information or details related to a recommended item, to indicate feedback regarding a recommended item, etc. In block 430, the generated Web page is then transmitted or otherwise provided to the user's device for display to the user. In other embodiments, rather than generate and transmit a Web page in blocks 425 and 430, respectively, the routine may instead transmit information related to the initial group of recommended items for display to the user (e.g., such as in another Web page and/or GUI executing on the user's device, or otherwise as discussed below with respect to block 450).

If it is instead determined in block 410 that an indication of an initial selection was not received, the routine continues to block 435 to determine whether an indication of a selection of a previously displayed recommended item is received. For example, such an indication may be received based upon execution of an instruction previously provided with a Web page generated in block 425 that was initiated by the user selecting the recommended item from the displayed Web page. If such an indication of an item selection is received, the routine continues to block 440 to obtain a new group of recommended items from the multiple items available from the one or more retailers, based at least in part on the selection of the recommended item, such as by interacting with an embodiment of the Recommendation Manager routine 500 of FIGS. 5A-5B (described below). For example, the routine 400 may request such a new group of recommended items, with the request including information indicative of the selection, and obtain the new group of recommended items in response to the request. In block 445, the routine then optionally retrieves product information associated with the new group of recommended items, such as in a manner similar to that of block 420. In block 450, the routine then transmits information about the new group of recommended items for display on the user's device, such as to update the display of a previously provided Web page on the user's device. In other embodiments, a new Web page or other UI screen may instead be generated and sent to the user's client device for display, such as in a manner similar to that of blocks 425 and 430.

If it is instead determined in block 435 that an indication of a selection of a previously displayed recommended item is not received, the routine continues instead to block 460 to optionally perform one or more other indicated actions as appropriate. In various embodiments, such other actions may include, for example, determining and providing to the user a new group of recommended items based on aggregate behavior of some or all customers of one or more retailers (e.g., top selling products, hot products, etc.), determining and providing to the user a new group of recommended items based on a received indication of another type of user interaction (e.g., an item rejection, an item de-selection, a user-provided rating or other feedback, etc.); determining and providing to the user additional information regarding a previously displayed recommended item (e.g., product details), such as based on a received indication of a user request for such additional information; initiating or otherwise facilitating a purchase of a recommended item, such as based on a received instruction from the user; etc.

After blocks 430, 450, and 460, the routine continues to block 465 to optionally store information about the user selection or other interaction received in block 407. For example, in some embodiments, such information may be stored and included as part of information that reflects prior interactions of multiple users with multiple items, such as for later use in one or more product recommendation strategies. In addition, in some embodiments, such information may also or instead be stored in association with the user who performed the interactions, such as for use in providing item recommendations to the particular user in future sessions based at least in part on the user's personal previous interactions (e.g., using such personal previous interactions to determine preferences of the user).

After block 465, the routine continues to block 498 to determine whether the routine is to continue, such as until an explicit indication to terminate is received. If the routine determines to continue, the routine returns to block 407 to await the next indication of user selection, and otherwise the routine ends in block 499. By returning to block 407, the user may successively select displayed product recommendations or otherwise interact with information about displayed product recommendations, such as part of an ongoing interactive recommendation exploration session in which the user may make a series of multiple current product recommendation selections that each further refine the relevance of the next group of recommended items for the user.

Figure 5A:
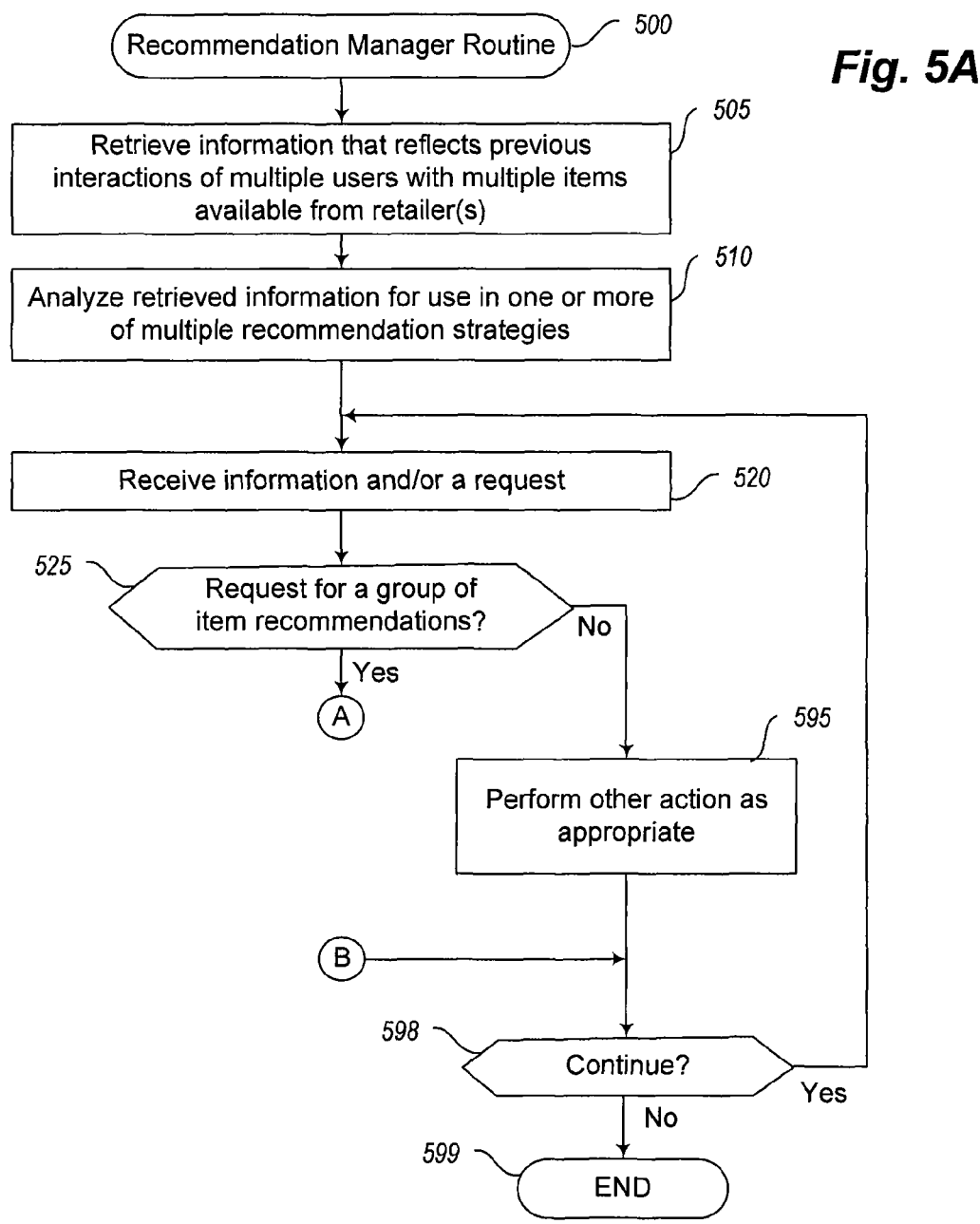
FIGS. 5A-5B are a flow diagram of an example embodiment of a Recommendation Manager routine.
Figure 5B:
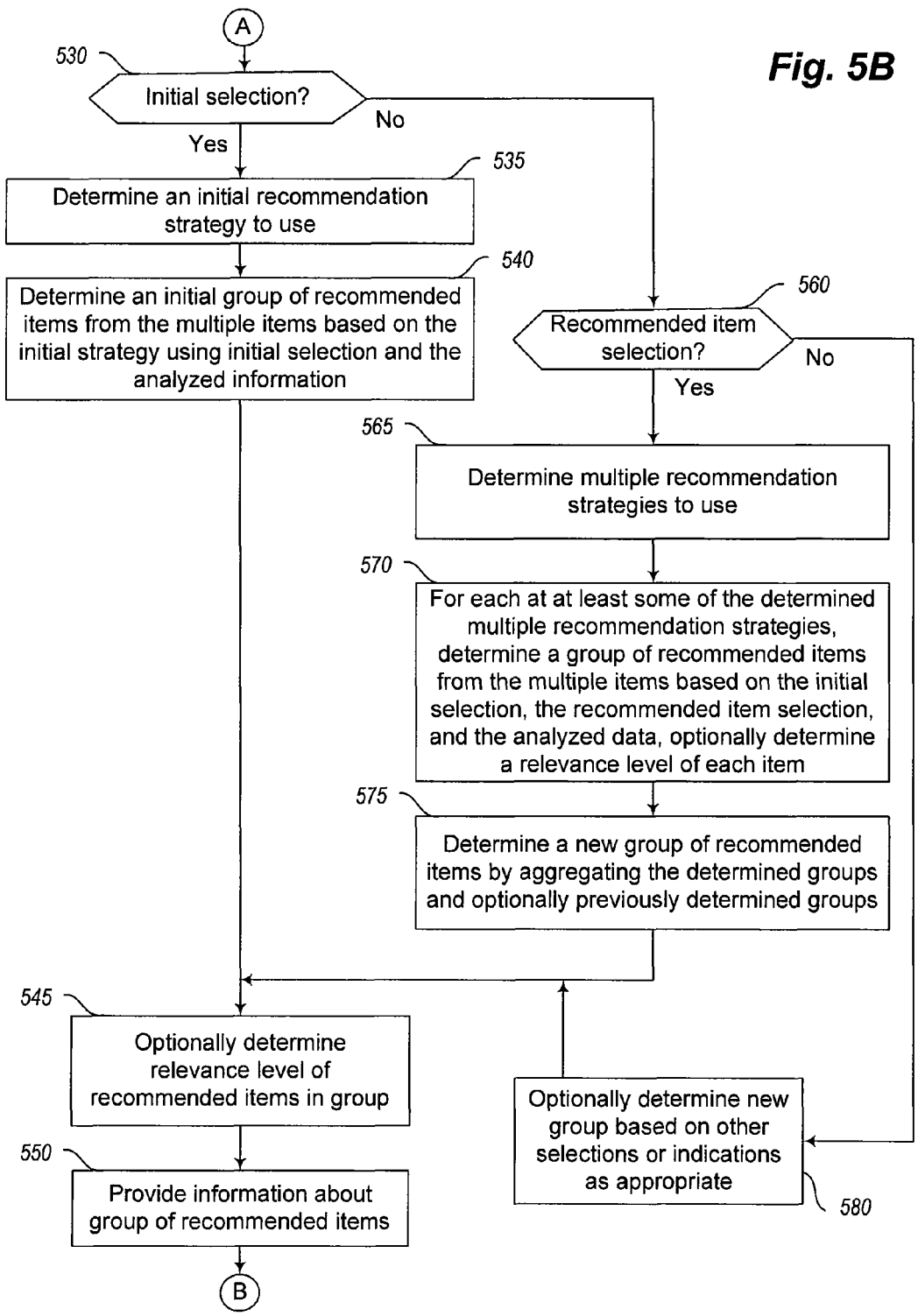

FIGS. 5A-5B are a flow diagram of an example embodiment of a Recommendation Manager routine 500. The routine may, for example, be provided by execution of the Recommendation Manager module 344 of FIG. 3 and/or otherwise as part of the MSPR service 105 of FIG. 1, such as to determine and provide item recommendations based on multiple recommendation strategies and various current information. In addition, in some embodiments, portions of the routine may be executed by code executing in memory 357 on one or more of the user computer systems 350 of FIG. 3, with partial results being stored in the memory 357 and/or storage 354. In this illustrated embodiment, the routine determines an initial group of recommended items in a first manner, and determines subsequent groups of recommended items in a second manner, but in other embodiments may operate in other manners. For example, in other embodiments, the routine may instead determine initial and subsequent groups of recommended items in a single manner, such as to determine a new group of recommended items for each received indication of one or more selected items.

The illustrated embodiment of the routine begins in block 505, where the routine retrieves information reflecting previous interactions of multiple users with multiple items available from one or more retailers. In block 510, the routine then analyzes the retrieved information to determine data for use in one or more of multiple recommendation strategies, such as to identify popular items and/or various relationships between items and/or various relationships between users and their patterns of interactions with items, etc. In some embodiments, such data may be stored in a database or other storage medium for later use in various recommendation strategies, and/or the routine in block 510 may instead retrieve such previously generated and stored information rather than perform a current analysis.

In block 520, the routine then receives information and/or a request. In this illustrated embodiment, at least some requests may include information related to user interactions (e.g., an indication of a user selection of one or more items, such as previously recommended items or other items) and/or other information that may be used as part of determining items from multiple available items of one or more retailers to recommend to a user.

In block 525, the routine determines whether a request for a determined group of item recommendations has been received, and if so continues to block 530 to determine whether the request is for an initial group of recommended items, such as based on information received with the request indicating an initial selection of a subset of one or more items of the multiple items. If so, the routine continues to block 535 to determine an initial recommendation strategy to use for determining the initial group of recommended items from the multiple items available from the one or more retailers. In some embodiments, the initial recommendation strategy may be predetermined (e.g., based at least in part on the initial subset of one or more items), such as to use a strategy that recommends items that are currently popular (e.g., the top 100 items purchased within the past month), or may instead be dynamically determined, such as based on which of multiple possible strategies currently provides the most results, etc. In addition, in some embodiments, one or more recommendation strategies may be more or less appropriate (or not appropriate at all) depending on the initial selection of the subset of one or more items, and in such embodiments, the initial recommendation strategy may be selected for use based on such considerations of appropriateness. In other embodiments, the initial recommendation strategy may include multiple recommendation strategies for use in determining an initial group of recommended items, such as is discussed with respect to blocks 565-575.

After an initial recommendation strategy is determined in block 535, the routine continues to block 540 to determine an initial group of recommended items based on the determined initial recommendation strategy and the initial selection of the subset of the one or more items, as well as the analyzed information reflecting the previous interactions of multiple users with multiple items. In various embodiments, various other types of information and/or indications may be used to determine the initial group of recommended items, including user preferences. In block 545, the routine then optionally determines relevance levels for the recommended items in the determined group, although in other embodiments, such relevance levels may be determined as part of determining the group of recommended items in block 540 (e.g., some recommendation strategies may inherently include rankings or weightings which may be used as relevance levels), or instead may not be used. In block 550, the routine then provides information about the determined group of recommended items to the requester.

If it is instead determined in block 530 that the request for a determined group of recommended items is not based on an initial selection, the routine continues instead to block 560 to determine whether the request for the determined group of recommended item is based on the selection of a previously recommended item. If so, the routine continues to block 565 to determine multiple recommendation strategies to use in recommending additional items to the user. In block 570, the routine determines, for each of at least some of the determined multiple recommendation strategies, a group of recommended items from the multiple items available from the one or more retailers, using the initial selection of the subset of one or more items, the current selected recommended item and optionally other recommended items selected as part of a current ongoing interaction session, and the analyzed information that reflects previous interactions of multiple users. In some embodiments, as part of the determining for a particular recommendation strategy, the various recommended items in the group for that strategy may be given a corresponding relevance level, such as a ranking, weighting, or other score.

In block 575, a new group of recommended items is determined by aggregating recommended items of the groups determined in block 570, and optionally the recommended items of one or more previously determined groups as well. The previously determined groups may include, for example, an initial group determined in block 540 and/or other groups previously determined in block 575. As described elsewhere, the results of multiple recommendation strategies may be combined in various ways in various embodiments to form a new group of recommended items, such as to include all of the items from the various groups determined in block 570, to include a subset of the items from the various groups determined in block 570, etc. The routine then continues to block 545, and optionally determines relevance levels for each of the recommended items in the determined group (e.g., by aggregating relevance levels determined for particular items by particular recommendation strategies in block 570), and continues to block 550.

If it is instead determined in block 560 that the request received in block 520 is not related to a selected recommended item, the routine continues to block 580 to optionally determine a new group of recommended items based on other indicated information. For example, in various embodiments, the routine may determine a new group of recommended items based on an indication that a user has removed or de-selected a previously selected item, based on an indication of user feedback with respect to one or more items, etc. After block 580, the routine continues to block 545 to optionally determine relevance levels for the recommended items in such a new group, and then to block 550.

If it is instead determined in block 525 that a request for a determined group of item recommendations has not been received, the routine continues instead to block 595 to optionally perform one or more other actions as appropriate. For example, in some embodiments, such other actions may include updating the information reflecting previous interactions of multiple users with multiple items and performing the analysis of such updated information (e.g., as described respectively with respect to blocks 505 and 510), providing information about previously determined recommended items, etc.

After blocks 550 and 595, the routine continues to block 598 to determine whether to continue, such as until an explicit indication to terminate is received. If the routine determines to continue, the routine returns to block 520 to wait for a next request or information submission, and otherwise the routine ends in block 599.

Figure 6:
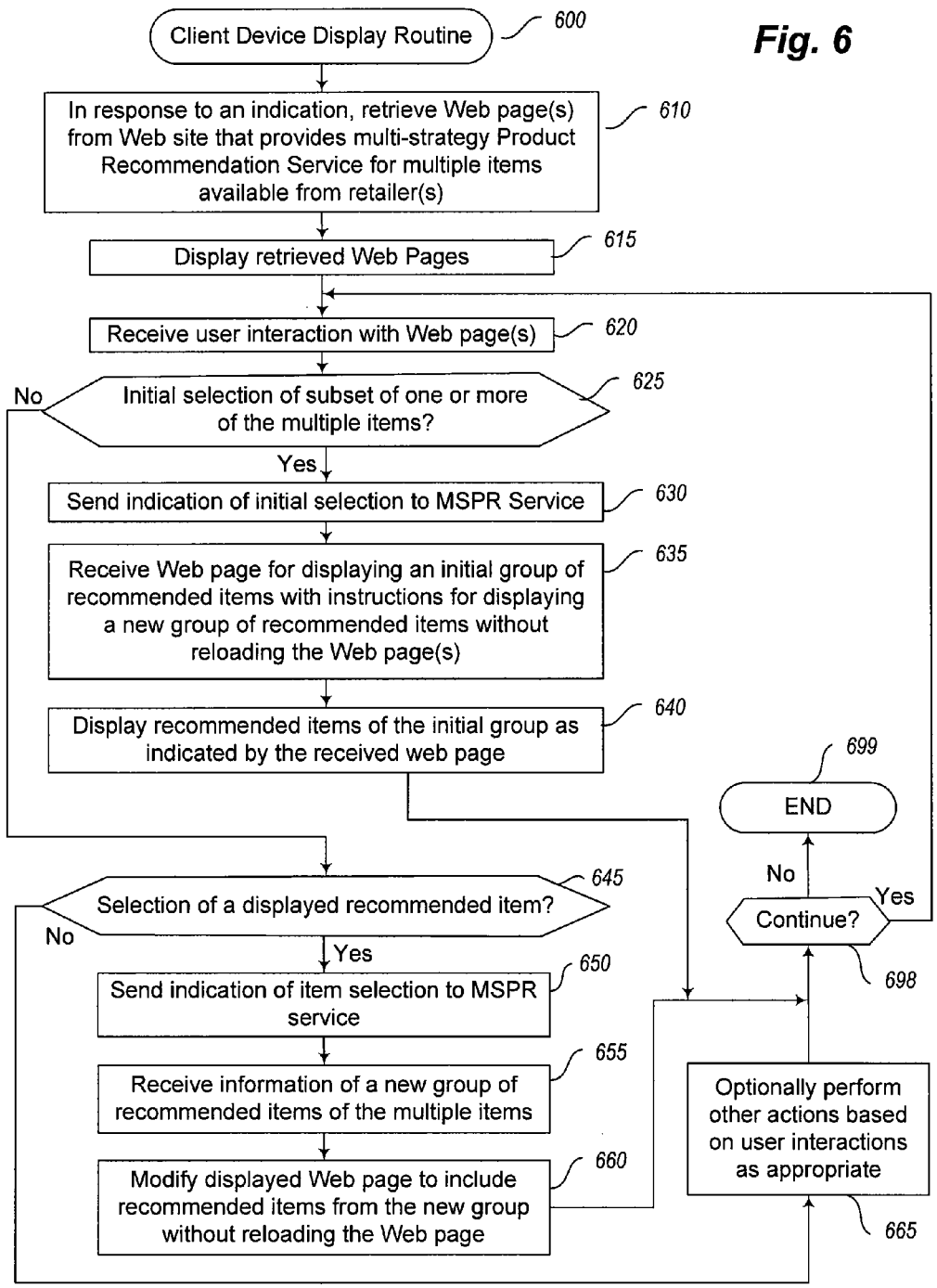
FIG. 6 is a flow diagram of an example embodiment of a Client Device Display routine.

FIG. 6 is a flow diagram of an example embodiment of a Client Device Display routine 600. The routine may, for example, be provided as part of an application executing on a client computing system or device of a user 140 of FIG. 1 and/or by execution of the browser or other software 358 of FIG. 3.

The illustrated embodiment of the routine begins in block 610, where in response to a user instruction or other indication, the routine retrieves a Web page provided as part of a GUI of an embodiment of the MSRP service, such as by interacting with an embodiment of the User Interface Manager routine 400 of FIG. 4. The indication to retrieve the Web page may be, for example, the result of a user navigating to a Web site of the MSRP service or of a retailer that the MSRP service supports (e.g., by entering or selecting a corresponding URL), the result of an automatically generated indication to retrieve such a Web page on behalf of the user, etc. In block 615, the routine then displays the retrieved Web page to the user. Such a display may include one or more user-selectable controls that allow the user to select or otherwise indicate one or more items available from one or more retailers, such as described elsewhere.

In block 620, the routine receives an indication of a user interaction with the displayed Web page. The routine continues to block 625 to determine whether the received user interaction is an initial selection of a subset of one or more items, and if so continues to block 630 to send an indication of the initial selection to an embodiment of the MSPR service (e.g., to the User Interface Manager routine 400 of FIG. 4) to obtain an initial group of recommended items that may be determined based at least in part on the initial selection of the subset. In block 635, the routine receives a corresponding Web page for displaying the initial group of recommended items determined by the MSPR service, and in block 640 displays the Web page. The received Web page may include instructions for retrieving and displaying an additional group of recommended items, such as in response to a selection of an initially displayed recommended item by the user, without causing the entire received Web page to be reloaded. The display of the Web page may, for example, display the recommended items in such a manner that items with higher associated relevance levels are displayed more prominently than items with lower associated relevance levels, such as described elsewhere. In some embodiments, the displayed Web page may also include functionality that allows the user to perform other actions, such as to initiate a purchase of a recommended item, view details or other information associated with a recommended item, indicate feedback related to an item, etc.

If it is instead determined in block 625 that the user interaction is not an initial selection of a subset of one or more items, the routine continues to block 645 to determine whether the user interaction is a selection of a previously displayed recommended item, such as a recommended item displayed in an initial group in block 635 and/or in another previously displayed group of recommended items. If so, the routine continues to block 650, and sends an indication of the selected recommended item to the MSPR service in order to obtain a new group of recommended items, such as may be determined based at least in part on the selected recommended item. For example, in this illustrated embodiment, the routine may send the indication to an embodiment of the User Interface Manager routine 400 of FIG. 4. In block 655, the routine receives information of a new group of recommended items, and in block 660 uses the information of the new group to modify the displayed Web page to include recommended items from the new group without reloading the entire Web page, such as in accordance with instructions included in the previously displayed Web page.

If it was instead determined in block 645 that the user interaction is not a selection of a recommended item, the routine instead continues to block 665 to optionally perform one or more other actions as appropriate. For example, in various embodiments, such actions may include initiating a purchase of a displayed recommended item; obtaining information or other details related to a displayed recommended item; facilitating removal or de-selection of previously selected items; obtaining various types of user-provided feedback, etc., and at least some such actions may cause a new group of recommended items to be obtained from the MSPR service and displayed in a manner similar to blocks 650-660 and/or cause a currently displayed group of recommended items to be otherwise modified or updated in various ways (e.g., adding or removing items, reordering displayed items); etc.

After blocks 640, 660 and 665, the routine continues to block 698 to determine whether to continue, such as until an explicit indication to terminate is received. If the routine determines to continue, the routine returns to block 620 to receive an additional user interaction with respect to the currently displayed Web page, and otherwise the routine ends in block 699.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects have been discussed in specific terms such as to be described as processes and/or systems and/or are presented below in certain claim forms, the inventors contemplate the various aspects of the invention in any available claim form, including methods, systems, computer-readable mediums on which are stored executable instructions or other contents to cause a method to be performed and/or on which are stored one or more data structures, computer-readable generated data signals transmitted over a transmission medium and on which such executable instructions and/or data structures have been encoded, etc.

What is claimed is:

1. A method for a computing system to dynamically generate and provide recommendation information to a user, the method comprising:

retrieving information that reflects previous interactions of a plurality of users with a plurality of products available from one or more online retailers; and under control of one or more configured computing systems, receiving information that indicates a selection by a first user of a subset of one or more of the plurality of products;

automatically determining a first recommendation group of multiple of the plurality of products to recommend to the first user and determining for each of the multiple products of the first recommendation group an associated relevance score with respect to the first user, the determining of the first recommendation group and of the relevance scores for the products of the first recommendation group being based on a first recommendation strategy that uses the received information about the selected subset of the one or more products and the retrieved information about the previous interactions of the plurality of users;

automatically generating a Web page for use in displaying the multiple products of the first recommendation group to the first user, the generated Web page including instructions to display products with higher associated relevance scores more prominently than other products with lower associated relevance scores, the generated Web page further including instructions to cause a retrieval of additional product recommendations without reloading of the generated Web page after the first user interacts with the generated Web page to select one of the multiple products of the first recommendation group; and after sending the generated Web page to the first user for display and after receiving an indication of one of the multiple products of the first recommendation group that the first user has selected by interacting with the generated Web page, automatically determining a second recommendation group of multiple of the plurality of products to recommend to the first user and determining for each of the multiple products of the second recommendation group an associated relevance score with respect to the first user, the second recommendation group being distinct from the first recommendation group, the determining of the second recommendation group and of the relevance scores for the products of the second recommendation group being based on a combination of the first recommendation strategy and of multiple other recommendation strategies, the first and multiple other recommendation strategies using the received information about the selected subset of the one or more products and the retrieved information about the previous interactions of the plurality of users and the selected one product of the first recommendation group; and sending information to the first user about the determined second recommendation group of multiple products for use in displaying the multiple products of the second recommendation group to the first user as part of a modification to the display of the generated Web page that is performed without reloading the generated Web page, the displaying of the multiple products of the second recommendation group including displaying products with higher associated relevance scores more prominently than other products with lower associated relevance scores.

2. The method of claim 1 wherein the first user has a first computing device that is remote from the one or more configured computing systems, and wherein the method further comprises, under control of the first computing device:

in response to the selection by the first user of the subset of one or more products, sending information to the one or more configured computing systems that indicates the selection;

receiving the sent generated Web page and displaying the received Web page to the first user, the displaying including displaying products of the first recommendation group that have higher associated relevance scores more prominently than other products of the first recommendation group that have lower associated relevance scores, the displaying of the products with the higher associated relevance scores more prominently being based at least in part on displaying those products before the other products that have the lower associated relevance scores;

in response to one or more interactions by the first user with the displayed Web page that select the one product of the first recommendation group, sending the indication of the selected one product of the first recommendation group to the one or more configured computing systems; and receiving the sent information about the determined second recommendation group, and modifying the displayed Web page to display the multiple products of the second recommendation group to the first user, the modifying being performed without reloading the Web page, the modifying including displaying products of the second recommendation group that have higher associated relevance scores more prominently than other products of the second recommendation group that have lower associated relevance scores.

3. The method of claim 2 further comprising, after the sending of the information to the first user about the determined second recommendation group of multiple products, receiving an indication of one of the multiple products of the second recommendation group that the first user has selected to purchase by interacting with the modified displayed Web page, and initiating a delivery of the purchased one product of the second recommendation group to the first user.

4. The method of claim 1 wherein the previous interactions of the plurality of users with the plurality of products include viewing information about the plurality of products that is provided by a first online retailer and purchasing the plurality of products from the first online retailer, and wherein the one or more configured computing systems are provided by the first online retailer.

5. A computer-implemented method comprising:

retrieving information that reflects previous interactions of a plurality of users with a plurality of items available for purchase from one or more retailers;

receiving information that indicates a selection by a first user of a subset of one or more of the plurality of items; and under control of one or more configured computing systems, automatically determining a first recommendation group of multiple of the plurality of items to recommend to the first user using a first recommendation strategy that is based at least in part on the selected subset of the one or more items;

generating information for use in displaying the multiple items of the first group to the first user in a generated Web page;

receiving an indication of one of the multiple items of the first group that the first user has selected from a display of the generated Web page;

determining, by the one or more configured computing systems, a combination of multiple recommendation strategies to use that are based at least in part on the selected subset of the one or more items and on the retrieved information about the previous interactions of the plurality of users and on the selected one item of the first group;

determining, by the one or more configured computing systems, a second recommendation group of multiple of the plurality of items to recommend to the first user that is distinct from the first group, the determining of the second group including:

for each of the multiple recommendation strategies of the determined combination, using the recommendation strategy to identify at least one item that is a candidate for the second group; and selecting the multiple items of the second group to include at least some items identified using the multiple recommendation strategies;

determining for each of the multiple items of the second group an associated relevance level;

sending information about the determined second group of multiple items for display to the first user as part of a modification of the displayed generated Web page, such that items of the second group with higher associated relevance levels are displayed more prominently than other items of the second group with lower associated relevance levels; and after the first user selects one of the multiple items of the determined second group via one or more interactions with the modified displayed generated Web page, the selected one item being a product available for purchase from one of the one or more retailers, initiating an order with the one retailer for the selected one item on behalf of the first user.

6. The method of claim 5 further comprising:

receiving an indication of the one item of the second group that the first user selects;

automatically determining a third recommendation group of multiple of the plurality of items to recommend to the first user that is distinct from the first and second groups, the determining of the third group using a combination of multiple recommendation strategies that are based at least in part on the selected subset of the one or more items and on the retrieved information about the previous interactions of the plurality of users and on the selected one item of the first group and on the selected one item of the second group, and determining for each of the multiple items of the third group an associated relevance level; and sending information about the determined third group of multiple items for display to the first user as part of a further modification of the displayed generated Web page, such that items of the third group with higher associated relevance levels are displayed more prominently than other items of the third group with lower associated relevance levels.

7. The method of claim 6 further comprising, after the sending of the information about the determined third group of multiple items and the displaying of that sent information to the first user as part of the further modification of the displayed generated Web page:

receiving an indication that the first user has de-selected one of the previously selected one item of the first group and of the previously selected one item of the second group;

automatically determining a fourth recommendation group of multiple of the plurality of items to recommend to the first user using a combination of multiple recommendation strategies that are based at least in part on the selected subset of the one or more items and on the retrieved information about the previous interactions of the plurality of users and on whichever of the previously selected one item of the first group and the previously selected one item of the second group that the first user did not de-select; and sending information about the determined fourth group of multiple items for display to the first user as part of an additional further modification of the displayed generated Web page.

8. The method of claim 5 further comprising, after the generated Web page is displayed to the first user and before the determining of the second recommendation group, receiving feedback from the first user regarding one or more of the multiple items of the first group, the feedback for each of the one or more items including an indication of at least one of a positive assessment of the item by the first user and of a negative assessment of the item by the first user, and wherein the determining of the second group of multiple items is further based at least in part on the received feedback from the first user.

9. The method of claim 5 further comprising, after the sending of the information about the determined second group of multiple items and the displaying of that sent information to the first user as part of the modification of the displayed generated Web page, receiving multiple additional indications that are each of at least one item that is selected by the first user after being previously displayed to the first user as part of a determined recommendation group, and responding to each of the additional indications by:

automatically determining a next recommendation group of multiple of the plurality of items to recommend to the first user by using a combination of multiple recommendation strategies that are based at least in part on the selected subset of the one or more items and on the retrieved information about the previous interactions of the plurality of users and on items previously selected by the first user from one or more previous determined recommendation groups; and sending information about the determined next recommendation group of multiple items for display to the first user as part of a modification of a current version of the displayed generated Web page.

10. The method of claim 5 wherein the multiple recommendation strategies of the combination used for the determining of the second group are each one of identifying items that are popular for a particular category of items to which the selected one item of the first group belongs, of identifying items that are popular for a particular retailer of items from which the selected one item of the first group is available, of identifying items that are similar to the selected one item of the first group based at least in part on those identified items each sharing one or more attributes with the selected one item of the first group, of identifying items that are related to the selected one item of the first group based at least in part on users who interact with the selected one item of the first group in one or more manners also interacting with those identified items in one or more manners, and of identifying items with which one or more users have indicated to group the selected one item of the first group.

11. The method of claim 5 wherein the multiple recommendation strategies of the combination used for the determining of the second group include each of identifying items that are popular for a particular category of items to which the selected one item of the first group belongs, of identifying items that are popular for a particular retailer of items from which the selected one item of the first group is available, of identifying items that are similar to the selected one item of the first group based at least in part on those identified items each sharing one or more attributes with the selected one item of the first group, of identifying items that are related to the selected one item of the first group based at least in part on users who interact with the selected one item of the first group in one or more manners also interacting with those identified items in one or more manners, and of identifying items with which one or more users have indicated to group the selected one item of the first group.

12. The method of claim 5 wherein the determining of the combination of the multiple recommendation strategies includes dynamically selecting the multiple recommendation strategies of the combination based at least in part on one or more of the selected subset of the one or more items, of the selected one item of the first group, and of the first user.

13. The method of claim 5 wherein the determining of the second recommendation group further includes, for each of the multiple recommendation strategies of the combination, determining a weighting for each of one or more items of the selected multiple items, and wherein the determining of the associated relevance level for each of the multiple items of the second group is based at least in part on aggregating the determined weightings from the multiple recommendation strategies.

14. The method of claim 13 wherein the automatic determining of the first recommendation group includes using the first recommendation strategy to determine a weighting for each of the multiple items of the first group, wherein the determining of the associated relevance level for each of the multiple items of the first group is based at least in part on the determined weightings from the first recommendation strategy, wherein the automatic determining of the second recommendation group includes incorporating at least some of the multiple items from the first group into the second group, and wherein the determining of the associated relevance level for each of the multiple items of the second group further includes, for each of the at least some items incorporated from the first group, basing the associated relevance level for the item for the second group on a reduction in the determined weighting from the first recommendation strategy for the first group.

15. The method of claim 5 wherein the selecting of the multiple items of the second group includes, for each of the multiple recommendation strategies of the determined combination, selecting one or more of the at least one item identified using the recommendation strategy to include in the second group, and wherein the determining of the associated relevance level for each of the multiple items of the second group is based at least in part on enhancing the associated relevance level for the item if it is identified using two or more of the multiple recommendation strategies.

16. The method of claim 5 wherein the selecting of the multiple items of the second group includes selecting a subset of the items identified using the multiple recommendation strategies, the selected subset of the items including items identified using two or more of the multiple recommendation strategies.

17. The method of claim 5 wherein the at least one item identified using one of the multiple recommendation strategies includes two or more identified items, and wherein the selecting of the multiple items of the second group includes selecting the one recommendation strategy to use for the second group based at least in part on the two or more identified items, such that the multiple items of the second group are the two or more identified items.

18. The method of claim 5 wherein the combination of the multiple recommendation strategies used for the determining of the second group does not include the first recommendation strategy.

19. The method of claim 5 wherein the selecting of the multiple items of the second group includes excluding the multiple items of the first group.

20. The method of claim 5 wherein the automatic determining of the first recommendation group of multiple items further uses one or more other recommendation strategies distinct from the first recommendation strategy.

21. The method of claim 20 wherein the combination of the multiple recommendation strategies used for the determining of the second group is the first recommendation strategy and the one or more other recommendation strategies.

22. The method of claim 5 wherein the automatic determining of the first recommendation group of multiple items using the first recommendation strategy is further based in part on the retrieved information about the previous interactions of the plurality of users.

23. The method of claim 5 wherein the automatic determining of the first recommendation group of multiple items using the first recommendation strategy is further based in part on previously obtained information about preferences of the first user.

24. The method of claim 5 wherein the selected subset of one or more items is one of multiple product categories for the plurality of items, wherein the multiple items of the first group are at least some of the items of the one product category, and wherein the first recommendation strategy includes selecting items that are frequently purchased from the one product category.

25. The method of claim 5 wherein the one or more items of the selected subset are individually selected by the first user, wherein the multiple items of the first group are distinct from the one or more items of the selected subset, and wherein the first recommendation strategy includes at least one of selecting items that are similar to the one or more items of the selected subset and of selecting items that are related to the one or more items of the selected subset in the previous interactions of the plurality of users.

26. The method of claim 25 wherein the one or more items of the selected subset include multiple items that are individually selected by the first user in a consecutive manner, such that a second of the multiple items is selected by the first user after the first user selects a first of the multiple items and after the second item is displayed to the first user based at least in part on the selection of the first item.

27. The method of claim 26 wherein the multiple items of the selected subset are alternatives for a type of item of interest to the first user, and wherein the individual selecting of the multiple items in the consecutive manner is performed so as to progressively identify a particular item of the item type of interest, such that each of the individual item selections after the first item is of greater interest to the first user than a previous of the multiple individual item selections.

28. The method of claim 5 wherein the one or more items of the selected subset include multiple items that are selected by the first user as a collection to be used together, and wherein the multiple items of the first recommendation group include, for each of the multiple items of the selected collection, one or more recommended items related to that item of the selected collection.

29. The method of claim 28 wherein the determining of the multiple items of the first recommendation group includes selecting recommended items that are related to all of the multiple items of the selected collection.

30. The method of claim 28 wherein the selected one item of the first group replaces one of the multiple items of the selected collection, such that the selected collection is modified to remove the replaced one item and to add the selected one item of the first group, and wherein the selecting of the multiple items of the second recommendation group includes modifying the multiple items of the first recommendation group by removing at least one of the one or more recommended items related to the replaced one item and adding at least one new recommended item related to the selected one item of the first group.

31. The method of claim 28 wherein the selected one item of the first group is added to the selected collection, and wherein the selecting of the multiple items of the second recommendation group includes modifying the multiple items of the first recommendation group by adding at least one new recommended item related to the selected one item of the first group.

32. The method of claim 28 further comprising receiving an instruction from the first user to initiate a purchase of multiple selected items that are part of a current collection for the first user, the multiple selected items of the current collection including the selected one item of the determined second group, and facilitating the purchase in accordance with the instruction.

33. The method of claim 5 wherein the modification of the displayed generated Web page is performed without reloading the generated Web page to include the sent information about the determined second group of multiple items by using Ajax techniques to include instructions in the generated Web page that cause a browser application on a client device of the first user that displays the generated Web page to interact with the one or more configured computing systems to obtain the sent information about the determined second group of multiple items and to perform the modification of the displayed generated Web page.

34. The method of claim 5 wherein the displaying of the multiple items of the first group to the first user in such a manner that items of the first group with higher associated relevance levels are displayed more prominently than other items of the first group with lower associated relevance levels includes sorting the multiple items of the first group based on associated relevance levels in descending order such that a first of the sorted items has a highest associated relevance level and a last of the sorted items has a lowest associated relevance level, and displaying the multiple items of the first group based on the sorting.

35. The method of claim 5 wherein the one or more retailers include a first online retailer from which the plurality of items are available to be purchased, wherein the plurality of users are customers of the first online retailer, wherein the information that reflects the previous interactions of the plurality of users with the plurality of items is obtained based at least in part on tracking interactions of the plurality of customer users with the first online retailer, and wherein the one or more configured computing systems provide a multi-strategy product recommendation service that determines recommendation groups of items for multiple customer users of the first online retailer.

36. A non-transitory computer-readable medium whose contents configure a computing device to generate and provide recommendations to a user, by performing a method comprising:

retrieving information that reflects interactions of a plurality of users with a plurality of products;

automatically determining, the configured computing device, a first group of multiple products of the plurality of products to recommend to a first user using a first collection of one or more of multiple recommendation strategies, the first group of multiple products being determined based on at least one of one or more products previously selected by the first user and of the information about the interactions of the plurality of users with the plurality of products;

providing information for use as part of a presentation to the first user to indicate the multiple products of the first group;

after receiving an indication of one of the multiple products of the first group that the first user has selected, automatically determining, by the configured computing device, a second group of multiple products of the plurality of products to recommend to the first user using a second collection of one or more of the multiple recommendation strategies that is distinct from the first collection, the one or more recommendation strategies of the second collection including a first recommendation strategy that selects at least one of the multiple products of the second group based on the selected at least one product being popular for a particular category of products, the second group of multiple products being determined based on multiple of the one or more products previously selected by the first user and of the selected one product of the first group and of the information about the interactions of the plurality of users with the plurality of products; and providing information for use as part of dynamically modifying the presentation to the first user to indicate the multiple products of the second group.

37. The non-transitory computer-readable medium of claim 36 wherein the second collection of recommendation strategies includes multiple recommendation strategies, wherein the multiple products of the second group are not identical to the multiple products of the first group, wherein the automatic determining of the second group of multiple products to recommend to the first user includes determining for each of the multiple products of the second group an associated relevance level based at least in part on the second collection of recommendation strategies, and wherein the providing of the information for use as part of the modifying of the presentation to the first user includes sending information about the second group of multiple products for display to the first user on a client device of the first user.

38. The non-transitory computer-readable medium of claim 37 wherein the interactions of the plurality of users with the plurality of products include previous interactions by the plurality of users with one or more retailers, wherein the plurality of products are available to be purchased from the one or more retailers, wherein the plurality of users are customers of the one or more retailers, and wherein the method further comprises, after the providing of the information for use as part of modifying the presentation to the first user, automatically initiating an order from one of the one or more retailers for the first user of the selected at least one product of the second group after the first user indicates that selected at least one product for purchase via one or more interactions with the modified presentation.

39. The non-transitory computer-readable medium of claim 36 wherein the computer-readable medium is a memory of the configured computing device, and wherein the contents are instructions that when executed program the configured computing device to perform the method.

40. A computing system configured to generate and provide recommendations to users, comprising:

one or more processors; and a product recommendation system configured to, when executed by at least one of the one or more processors, provide recommendations to multiple users by, for each of the users:

obtaining information that reflects interactions of a plurality of users with a plurality of items;

automatically determining a first group of multiple of the plurality of items to recommend to the user using one or more recommendation strategies, the first group of multiple items being determined based on at least one of one or more items previously selected by the user and of the information about the interactions of the plurality of users with the plurality of items;

providing information for use as part of a display to the user to indicate the multiple items of the first group;

after receiving an indication of at least one of the multiple items of the first group that the user has selected, automatically determining a second group of multiple of the plurality of items to recommend to the user using a combination of multiple recommendation strategies, the second group of multiple items being distinct from the first group of multiple items and being determined based on multiple of the one or more items previously selected by the user and of the selected at least one items of the first group and of the information about the interactions of the plurality of users with the plurality of items; and providing information for use as part of dynamically modifying the display to the user to indicate the multiple items of the second group.

41. The computing system of claim 40 wherein, for one of the multiple users, the one or more recommendation strategies used for the determining of the first group are at least some of the multiple recommendation strategies used for the determining of the second group, the automatic determining of the second group of multiple items to recommend to the one user includes determining for each of the multiple items of the second group an associated relevance level based at least in part on the combination of the multiple recommendation strategies, and the providing of the information for use as part of the dynamic modifying of the display to the one user includes sending information about the second group of multiple items for display to the one user on a client device of the one user.

42. The computing system of claim 40 wherein, for one of the multiple users, the interactions of the plurality of users with the plurality of items include previous interactions by the plurality of users with one or more retailers, the plurality of items are products available to be purchased from the one or more retailers, and the product recommendation system is further configured to, after the providing of the information for use as part of dynamically modifying the display to the one user, automatically initiate an order with one of the one or more retailers on behalf of the one user for one of the multiple items of the second group after the one user selects that one item for purchase via one or more interactions with the modified presentation.

43. The computing system of claim 40 wherein the product recommendation system includes software instructions for execution by the at least one processors of the computing system.

44. The computing system of claim 40 wherein the product recommendation system consists of one or more means for performing the providing of the recommendations to the multiple users.

45. The non-transitory computer-readable medium of claim 36 wherein the determining of the second group of multiple products to recommend to the first user further includes:
  determining, by the configured computing device, a plurality of distinct recommendation strategies to use for the second collection;
  for each of the plurality of recommendation strategies of the second collection, using the recommendation strategy to identify at least one product that is a candidate for the determined second group of multiple products; and
  selecting the multiple products of the second group to include at least some products identified using the plurality of recommendation strategies.

46. The non-transitory computer-readable medium of claim 45 wherein the selecting of the multiple products of the second group includes selecting a subset of the products identified using the plurality of recommendation strategies, the selected subset of the products including products identified using two or more of the plurality of recommendation strategies.

47. The non-transitory computer-readable medium of claim 45 wherein the at least one product identified using one of the plurality of recommendation strategies includes two or more identified products, and wherein the selecting of the multiple products of the second group includes selecting the one recommendation strategy to use for the second group based at least in part on the two or more identified products, such that the multiple products of the second group are the two or more identified products.

48. The non-transitory computer-readable medium of claim 36 wherein the one or more recommendation strategies of the second collection include the first recommendation strategy and one or more additional recommendation strategies, and wherein the method further comprises:
  using the first recommendation strategy to select the at least one product of the second group based on the selected at least one product being identified as popular for the particular category of products; and
  using at least one of the one or more additional recommendation strategies to select one or more products of the second group based on the selected one or more products being identified as popular for a particular retailer of products.

49. The non-transitory computer-readable medium of claim 36 wherein the one or more recommendation strategies of the second collection include the first recommendation strategy and further include one or more additional recommendation strategies, the multiple additional recommendation strategies including at least identifying products that are similar to the selected one product of the first group based at least in part on those identified products each sharing one or more attributes with the selected one product of the first group, and identifying products with which one or more users have indicated to group the selected one product of the first group.

50. The non-transitory computer-readable medium of claim 36 wherein the method further comprises, after the providing of the information for use as part of the presentation to the first user to indicate the multiple products of the first group, receiving feedback from the first user in addition to selection of the one product of the first group that includes at least one indication of a positive assessment by the first user of one or more of the multiple products of the first group and of a negative assessment by the first user of one or more of the multiple products of the first group, and wherein the determining of the second group of multiple products is further based at least in part on the received feedback from the first user.

* * * * *